(12) United States Patent
Whitmore et al.

(10) Patent No.: US 6,253,166 B1
(45) Date of Patent: Jun. 26, 2001

(54) STABLE ALGORITHM FOR ESTIMATING AIRDATA FROM FLUSH SURFACE PRESSURE MEASUREMENTS

(75) Inventors: Stephen A. Whitmore, Lake Hughes; Brent R. Cobleigh, Palmdale; Edward A. Haering, Jr., Lancaster, all of CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/173,608

(22) Filed: Oct. 5, 1998

(51) Int. Cl.[7] ............................. G06F 17/11; G06F 19/00

(52) U.S. Cl. ................................. 703/2; 701/6; 701/14; 702/150; 700/89

(58) Field of Search ................................ 703/1, 2; 701/6, 701/14, 3, 4, 7; 702/138, 147, 150; 73/861.65; 244/75 R, 181; 700/28, 69, 89

(56) References Cited

U.S. PATENT DOCUMENTS

| 4,769,759 | * | 9/1988 | McGough | 701/6 |
| 5,170,969 | * | 12/1992 | Lin | 244/194 |
| 5,797,105 | * | 8/1998 | Nakaya et al. | 701/7 |

OTHER PUBLICATIONS

Hagen et al. F.W. Deutsche Airbus Flight Test of Rosemount Smart Probe for Distributed Air Data Systems, IEEE Aerospace abd Electronics Systems Magazine, vol. 9 4, Apr. 1994, pp. 7–14, Aug. 1994.*

Prinke P. The C–17 Dual–Channel Air Data Computer, Proceedings of the IEEE 1993 National Aerospace and Electronics Conference, NAECON 1993, pp. 769–775, Aug. 1993.*

Mulkins D.F. An Integrated Probe/Sensor Design for Future Distributed Air Data System Applications, Proceedings of the IEEE 1988 National Aerospace and Electronics Conference, NAECON 1988, pp. 309–316, May 1988.*

Taniguchi et al. D.K. Processing Flight Test Data, IEEE Potentials, vol. 10 3, Oct. 1991, pp. 55–57, Aug. 1994.*

* cited by examiner

*Primary Examiner*—Kevin J. Teska
*Assistant Examiner*—Russell W. Frejd
(74) *Attorney, Agent, or Firm*—John H. Kusmiss

(57) ABSTRACT

An airdata estimation and evaluation system and method, including a stable algorithm for estimating airdata from nonintrusive surface pressure measurements. The airdata estimation and evaluation system is preferably implemented in a flush airdata sensing (FADS) system. The system and method of the present invention take a flow model equation and transform it into a triples formulation equation. The triples formulation equation eliminates the pressure related states from the flow model equation by strategically taking the differences of three surface pressures, known as triples. This triples formulation equation is then used to accurately estimate and compute vital airdata from nonintrusive surface pressure measurements.

17 Claims, 8 Drawing Sheets

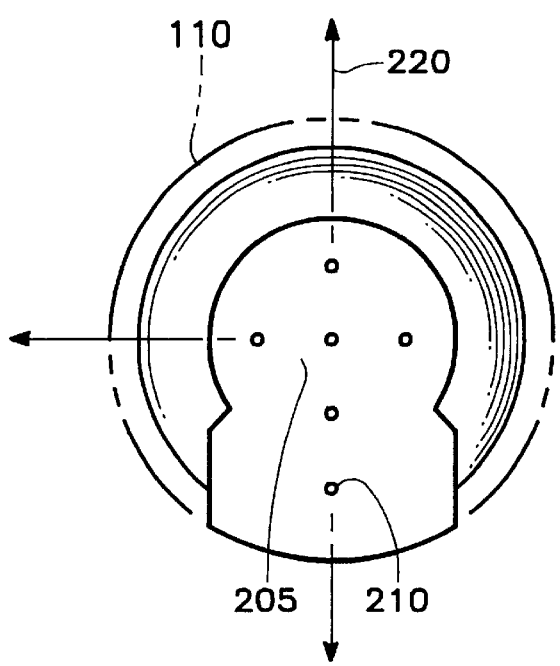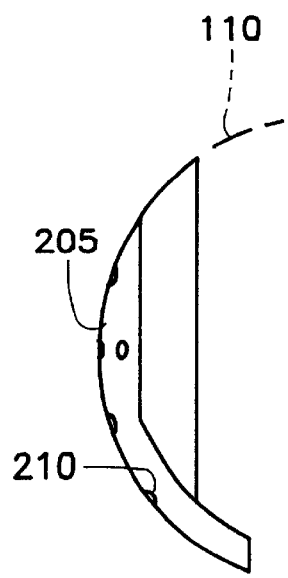
FIG. 2
FIG. 3
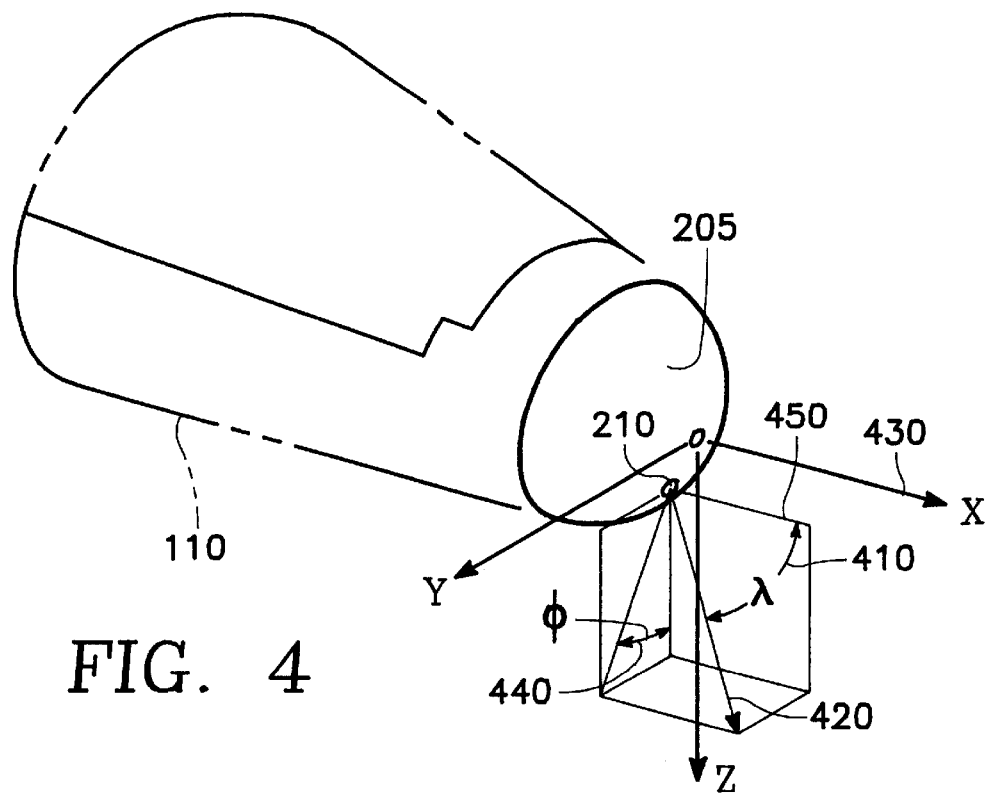
FIG. 4

STABLE ALGORITHM FOR ESTIMATING AIRDATA FROM FLUSH SURFACE PRESSURE MEASUREMENTS

ORIGIN OF THE INVENTION

The invention described herein was made in the performance of work under a NASA contract, and is subject to the provisions of Public Law 96-517 (35 U.S.C. § 202) in which the Contractor has elected not to retain title.

BACKGROUND OF THE INVENTION

1. Field of the Invention The present invention relates in general to flow instrumentation and more particularly to an airdata estimation and evaluation system and method for estimating and evaluating airdata from noninstrusive surface pressure measurements.

2. Background Art

Airdata are critical information for any type of flight vehicle. Airdata are those parameters, characteristics, properties and quantities derived from the air surrounding the flight vehicle. Accurate airdata are absolutely necessary for many purposes and applications and help to ensure efficient and safe flight.

For example, a pilot cannot safely fly an aircraft without knowing its airspeed and pressure altitude. In civil aviation, air traffic controllers determine the separation distances between aircraft based on accurate knowledge of the aircraft's pressure altitude. If the airdata is inaccurate, the aircraft's true pressure altitude may differ greatly from its reported pressure altitude, and disaster may result.

Numerous other aircraft systems also need accurate airdata. Autopilot, engine controls, cockpit and cabin environmental controls, weapons delivery, navigation and air traffic control are just a few examples of aircraft systems that depend on accurate airdata.

Airdata are most accurate when the undisturbed air away from the flight vehicle is measured. This is because the presence of the flight vehicle in the air can cause measurement errors. Moreover, as the velocity of the flight vehicle increases, compressibility and shock waves further disrupt the surrounding air.

Traditionally, in order to mitigate these errors, airdata measurements have been performed using booms that extend outward from the flight vehicle and measure the undisturbed air. Typically, these intrusive booms contain a pressure-measuring instrument that operates by stagnating the freestream flow and measuring the difference between static and impact pressure. These booms are usually located at the nose of the flight vehicle. Although these booms are excellent at making steady measurements at low-to-moderate angles of attack, the booms are sensitive to vibration, alignment error and are easily damaged in flight or on the ground.

There are also several applications where an intrusive boom is undesirable. For example, on hypersonic aircraft an intrusive boom may either be torn off by the forces generated in flight or melted by the high temperatures involved in high-speed flight. On stealth aircraft, where a minimum radar cross section is required, an intrusive boom is undesirable because it makes the aircraft highly visible to radar. Therefore, intrusive booms are generally unsuitable for airdata measurements in more advanced types of flight vehicles.

One technique developed to overcome these difficulties with the conventional intrusive boom was a flush airdata sensing (FADS) system. Unlike the intrusive boom that directly measures airdata from the freestream air, the FADS system infers airdata from nonintrusive surface pressure measurements.

The fundamental concept of the FADS system is that it does not require probing of the freestream flow in order to compute airdata. Instead, airdata can be estimated and evaluated from flush surface pressure measurements. These pressure measurements are then related to airdata using aerodynamic model equations that mathematically describe the flow. Solving the aerodynamic model equations mathematically extracts the airdata given the surface pressure measurements.

One early use of a FADS system was in the 1960s by the X-15 high-altitude, hypersonic aircraft. The X-15 FADS system used a hemispherical nose that was actively steered into the local relative wind to make airdata measurements. One drawback to this system, however, was that the actively steered nose was an extremely complicated mechanical design. Consequently, the steered-nose FADS system was abandoned with the termination of the X-15 program.

A modern FADS system was developed as an experiment on the space shuttle. The shuttle entry airdata system (SEADS) was a "ride-along" experiment aboard the shuttle but never was used to actually provide airdata to the shuttle pilot. The SEADS used a matrix of fixed static-pressure measurements and required no mechanical steering of the nose.

The problem, however, with both of these systems is that both are quite inaccurate. This is because the two systems merely focused on the feasibility of the FADS concept and made no attempt to derive algorithms for more accurate estimation and evaluation of airdata from the surface pressure measurements.

The next advance in FADS technology was a real-time, high angle-of-attack FADS (HI-FADS) system. The HI-FADS design, as with the earlier X-15 FADS system and the SEADS, used a matrix of flush static-pressure orifices arranged on the nose of the flight vehicle. Moreover, the HI-FADS system did attempt to derive algorithms for estimating and evaluating airdata from surface pressure measurements.

One problem, however, with the HI-FADS design is the complexity of the algorithm and the associated increased costs. In particular, the system incorporates all surface pressure measurements simultaneously into an overdetermined estimation algorithm. Furthermore, airdata parameters are inferred using nonlinear regression methods. However, the use of these nonlinear regression cause the estimation algorithm to be highly unstable and complex. In addition, the cost of maintaining the software implementing this algorithm is quite high.

In order to solve these aforementioned problems with these prior art FADS systems, the present invention was developed to provide a reliable and accurate FADS system for use in the X-33 flight vehicle program. The X-33 is 53-percent scale model of the Single Stage to Orbit (SSTO) Reusable Launch Vehicle (RLV) rocket system. The primary goal of the SSTO program is to radically reduce the cost of access to space, and the X-33 is a demonstrator of this advanced technology. The X-33 is designed to achieve a peak altitude near 300,000 feet and speeds of greater than Mach 12. After atmospheric re-entry, the X-33 returns to Earth in an unpowered horizontal landing.

Because the X-33 will perform an unpowered landing (i.e. there is only a single landing attempt), highly accurate determination of the airdata such as dynamic pressure, angle-of-attack, and surface winds is critical to insure that the target runway can be reached under a wide variety of atmospheric conditions. Furthermore, direct feedback of angle-of-attack and angle-of-sideslip may reduce the gust-load on the vehicle airframe during the ascent phase of the flight.

The determination was made early in the X-33 program that the full airdata state including Mach number, angle-of-attack, angle-of-sideslip, dynamic pressure, airspeed and altitude would be a critical requirement for both the RLV and the X-33 and that existing FADS algorithms could not adequately fulfill this requirement.

Specifically, there are several problems with existing FADS algorithms. One problem is that the nonlinear regression method used in the estimation algorithm tends to be highly unstable. In fact, the software implementing this algorithm requires numerous special software patches in an attempt to maintain stability.

This highly unstable algorithm leads to the problem of complexity. Specifically, the special software patches required to make the algorithm stable also require a complex maze of software designed to maintain stability. Moreover, the cost of establishing and maintaining this software is extremely high.

Another problem with existing FADS systems is that the unstable estimation algorithm can lead to numerous reliability problems. This, in turn, has detrimental consequences for the flight vehicle that relies on accurate airdata.

Therefore, what is needed is a FADS system that has a highly stable estimation and evaluation algorithm that can easily be implemented with a minimum of cost and maintenance. Moreover, what is further needed is a FADS system having an estimation and evaluation algorithm that is extremely reliable and provides highly accurate airdata for use by the various systems of the flight vehicle.

Whatever the merits of the above-mentioned FADS systems and methods, they do not achieve the benefits of the present invention.

NOMENCLATURE

| | |
|---|---|
| A | Angle-of-Attack Triples Algorithm Coefficient |
| a | FADS geometry Coefficient |
| A' | Angle-of-Sideslip Triples Algorithm Coefficient |
| $A_0(M_\infty)$ | Zero'th Order Angle of Attack Calibration Coefficient |
| $A_1(M_\infty)$ | First Order Angle of Attack Calibration Coefficient |
| $A_2(M_\infty)$ | Second Order Angle of Attack Calibration Coefficient |
| $A_3(M_\infty)$ | Third Order Angle of Attack Calibration Coefficient |
| B | Angle-of-Sideslip Triples Algorithm Coefficient |
| $B_0(M_\infty)$ | Zero'th Order Angle of Sideslip Calibration Coefficient |
| $B_1(M_\infty)$ | First Order Angle of Sideslip Calibration Coefficient |
| $B_2(M_\infty)$ | Second Order Angle of Sideslip Calibration Coefficient |
| $B_3(M_\infty)$ | Third Order Angle of Sideslip Calibration Coefficient |
| b | FADS Geometry Dummy Variable |
| B' | Angle-of-Sideslip Triples Algorithm Dummy Variable |
| C' | Angle-of-Sideslip Triples Algorithm Dummy Variable |
| $f[M_\infty]_{subsonic}$ | Subsonic Mach Number Function |
| $f[M_\infty]_{supersonic}$ | Supersonic Mach Number Function |
| M | Estimation Algorithm Geometry Matrix |
| $M_\infty$ | Freestream Mach number |
| $P_\infty$ | Freestream Static Pressure, psf. |
| $p_i$ | Pressure Value, i'th FADS port, psf. |
| Q | Pressure Weighting Matrix |
| q | Weights on Measured Pressures |
| qc | Impact pressure, psf. |
| x | State Vector |
| $X^2$ | Mean Squared Fit Error, $psf^2$ |

-continued

| | |
|---|---|
| $\alpha$ | Angle of attack, generic, degrees |
| $\alpha_e$ | Local Angle of attack sensed by FADS, degrees |
| $\alpha_{true}$ | Freestream Angle of attack, degrees |
| $\beta$ | Angle of sideslip, generic, degrees |
| $\beta_e$ | Local Angle of sideslip sensed by FADS, degrees |
| $\beta_{true}$ | Freestream Angle of sideslip, degrees |
| $\beta_1$ | Quadratic Solution 1 for Angle of sideslip, degrees |
| $\beta_2$ | Quadratic Solution 2 for Angle of sideslip, degrees |
| $\delta\alpha$ | Angle of attack correction term, degrees |
| $\delta\beta$ | Angle of sideslip correction term, degrees |
| $\Gamma$ | Pressure Difference for Triples Algorithm, psf |
| $\gamma$ | Ratio of Specific Reats |
| $\epsilon$ | Position Error Calibration Parameter |
| $\epsilon_M$ | Variation of $\epsilon$ with Mach number at $\alpha_e, \beta_e = 0$ |
| $\epsilon_{\alpha 1}$ | First Order Coefficient, Fit of $\epsilon$ with Angle of Attack |
| $\epsilon_{\alpha 2}$ | Second Order Coefficient, Fit of $\epsilon$ with Angle of Attack |
| $\epsilon_{\beta 1}$ | First Order Coefficient, Fit of $\epsilon$ with Angle of Sideslip |
| $\epsilon_{\beta 2}$ | Second Order Coefficient, Fit of $\epsilon$ with Angle of Sideslip |
| $\lambda$ | Cone angle of FADS port, degrees |
| $\phi$ | Clock angle of FADS port, degrees |
| $\theta$ | Local flow incidence angle, degrees |
| $\sigma$ | Standard deviation |
| $\Psi$ | Dummy Variable Used in Angle of Sideslip Root Analysis |
| $\chi^2$ | Chi-Squared Distribution |
| $\Omega$ | FADS Geometry Term, $\cos^2\theta + \epsilon \sin^2\theta$ |

Superscripts, Subscripts, and Mathematical Operators

| | |
|---|---|
| i | Port index |
| j | Port index |
| (j) | Iteration Index |
| k | Port index |
| $\hat{}$ | FADS Estimate |
| Det[.] | Matrix Determinant |
| $[.]^{-1}$ | Matrix Inverse |
| $[.]^T$ | Matrix Transpose |
| $\nabla[.]_x$ | Gradient with Respect to Vector x |
| $\dfrac{\partial[.]}{\partial x}$ | Partial Derivative with Respect to x |

Acronyms

| | |
|---|---|
| A/D | Analog to Digital Conversion |
| FADS | Flush Airdata Sensing |
| RLV | Reusable Launch Vehicle |

SUMMARY OF THE INVENTION

To overcome the limitations in the prior art as described above and other limitations that will become apparent upon reading and understanding the present specification, the present invention is embodied in an airdata estimation and evaluation system and method for estimating and evaluating airdata from nonintrusive surface pressure measurements.

The airdata estimation and evaluation system of the present invention includes a triples formulation module for eliminating the pressure related states from the flow model equation, an angle of attack module for computing the angle of attack, an angle of sideslip module for computing the angle of sideslip and an airdata module for estimating and evaluating other airdata. Furthermore, the present invention includes a method for estimating and evaluating airdata using this apparatus. The system and method of the present invention determine airdata in an economical, reliable and highly stable manner.

In a preferred embodiment, the airdata estimation and evaluation system is utilized in a FADS system on a vehicle within a flowfield. Preferably, the FADS system includes nonintrusive flush-mounted surface pressure sensors for providing pressure measurements and the airdata estimation and evaluation system for computing the airdata parameters. Moreover, the computed airdata is received by an airdata processor that determines whether, based upon the airdata received, any changes or adjustments to the vehicle are necessary. These adjustments may include changes in velocity and attitude. If the airdata processor determines that changes are necessary, these changes are effected by a control system in response to the airdata processor's commands. The control system may make effect changes by physically moving the vehicle's control surfaces or adjusting the power delivered by the powerplant.

The airdata estimation and evaluation system includes a triples estimation module, for evaluating a triples formulation equation using the surface pressure measurements and an angle of attack (AOA) module. The AOA module is used for computing an angle of attack using the triples formulation equation. Furthermore, the triples estimation module includes an angle of sideslip (AOS) module, for computing the angle of sideslip using the computed angle of attack and the triples formulation equation. Further, the system includes an airdata module for estimating and evaluating other airdata using the computed angle of attack and the computed angle of sideslip.

The airdata estimation and evaluation system of the present invention may also be implemented as a method as a dedicated logic circuit or a field programmable gate array. Preferably, the airdata estimation and evaluation system contains a microprocessor and memory for storing the instructions coded with the method of the present invention.

The method of the present invention includes a triples formulation function, an angle of attack function, an angle of sideslip function and an airdata function. The triples formulation function transforms the given flow model equation into a triples formulation equation.

The angle of attack function computes an angle of attack from the triples formulation equation. In a similar manner, the angle of sideslip function computes the angle of sideslip. The airdata function estimates and evaluates airdata using the flow model equation, the computed angle of attack and the computed angle of sideslip.

The present invention may also be implemented in a computer-readable medium whose contents cause a computer to function as an airdata estimation and evaluation system as described above. Moreover, the present invention may also include a computer-readable memory device encoded with a data structure for estimating and evaluating airdata as described above. This airdata used by the airdata processor to determine the necessary corrections to the vehicle in the flowfield.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

Referring now to the drawings in which like reference numbers represent corresponding parts throughout:

FIG. 2 is a front view of the X-33 flight vehicle of FIG. 1 illustrating the preferred configuration of the surface pressure sensor matrix on the nose of the vehicle.

FIG. 3 is a side view of FIG. 2 further showing the configuration of the six sensors of the surface pressure sensor matrix.

FIG. 4 a perspective view of the nose of the X-33 flight vehicle in FIGS. 2 and 3 illustrating the coordinate angles for the surface pressure sensor matrix.

DETAILED DESCRIPTION OF THE PREFERRED EMBODIMENT

Figure 1:
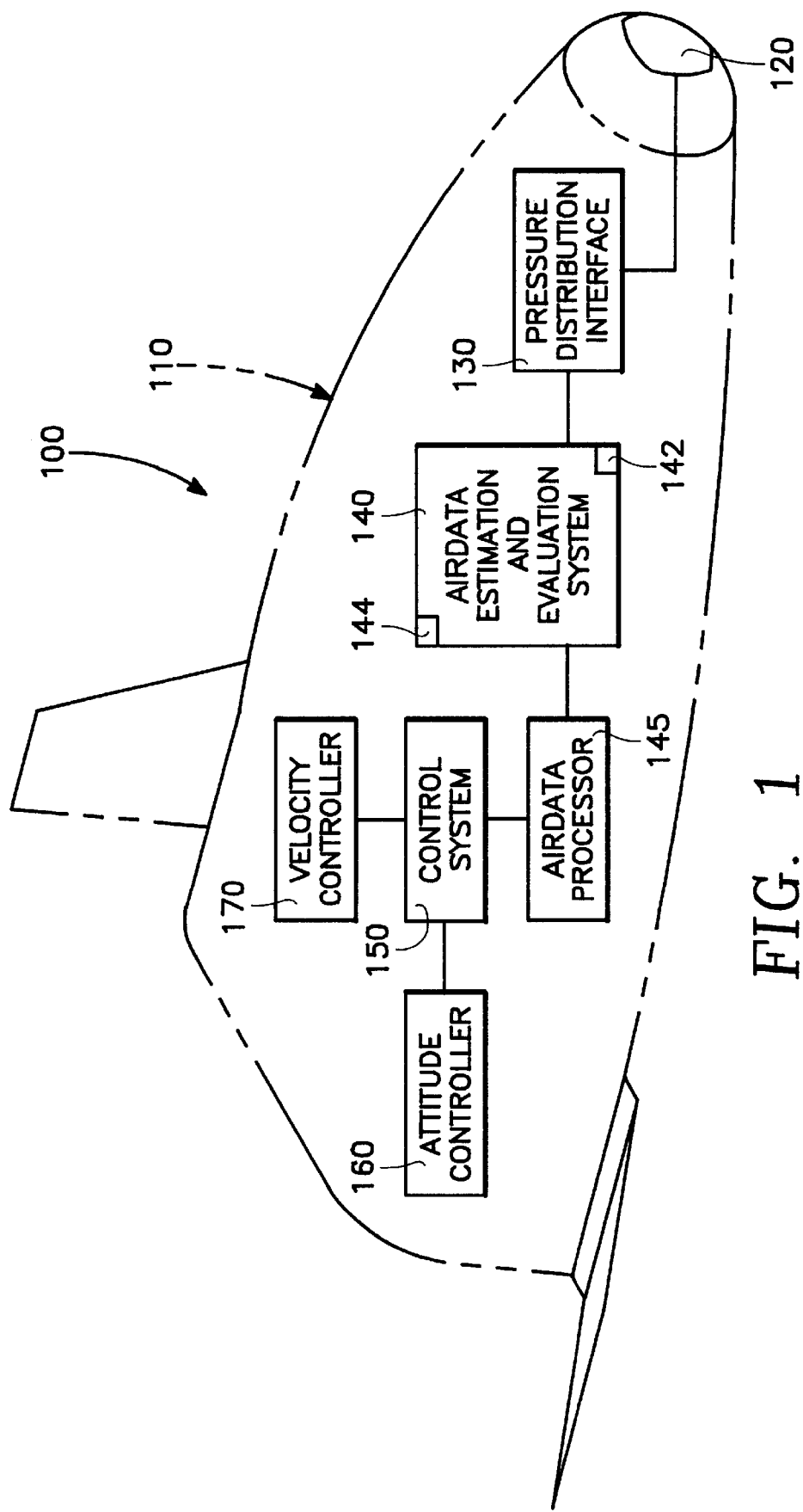
FIG. 1 is an overview of the flush airdata sensor (FADS) system of the present invention as implemented on an X-33 flight vehicle.

In the following detailed description of the preferred embodiment, reference is made to the accompanying drawings in which is shown by way of illustration a specific embodiment whereby the invention may be practiced. It is to be understood that other embodiments may be utilized and structural changes may be made without departing from the scope of the present invention.

I. Introduction

As shown in the drawings for purposes of illustration, the present invention is embodied in an apparatus that includes an airdata estimation and evaluation system. The invention may also be implemented as a method for estimating and evaluating airdata using this system. The system and method of the present invention provides a highly accurate, extremely reliable and relatively simple way for airdata to be extract from nonintrusive surface pressure measurements. Existing FADS systems include highly unstable algorithms, extremely complicated software implementing these algorithms and are inaccurate and unreliable.

The present invention includes an airdata estimation and evaluation system for estimating and evaluating airdata from surface pressure measurements. This system includes a triples formulation module for transforming the flow model equations into a triples formulation equation in order to eliminate certain variable from the flow model equation. The system also includes an angle of attack module for computing an angle of attack from the triples formulation equation and an angle of sideslip module for computing the angle of sideslip from the triples formulation equation. Furthermore, the system includes an airdata module for computing the remaining airdata quantities using the angle of attack and the angle of sideslip.

The method of the present invention may be implemented in the above system and includes a way to estimate and evaluate airdata from nonintrusive surface pressure measurements using the aforementioned apparatus.

It should be noted that, although throughout specification reference is made the air as the medium, nearly any fluid or gas capable of having pressure measured could be used in place of air. In this situation, the airdata would become airdata, since air would no longer be the medium. For example, the present invention may be utilized in a submarine moving through water.

The airdata estimation and evaluation system of the present invention is capable of accurately computing airdata. In particular, the surface pressure data is strategically chosen such that certain pressure dependent terms drop out of the flow model equation. This permits the flow model equation to be solved without the use of nonlinear regression methods and results in a more accurate and a more stable algorithm. Moreover, the code required to implement and maintain the system of the present invention is more economical and less complex than prior art systems.

II. Structural Overview of the Invention

FIG. 1 is an overview of the flush airdata sensing (FADS) system 100 suitable for utilizing the new airdata estimation and evaluation system and method of the present invention. The FADS system 100 of the present invention is shown implemented on a flight vehicle 110. In the illustration, the flight vehicle 110 is the X-33 test vehicle as described above.

The FADS system 100 includes a surface pressure sensor matrix 120 located at the nose area of the flight vehicle 110. Preferably, the number of sensors in the surface pressure sensor matrix 120 is six. This number was selected as a compromise between the need to accurately measure the flow conditions at the nose and the cost of locating the sensors on the flight vehicle 110. Because, in the case of a flight vehicle, there are four airdata states and a calibration parameter to be estimated, at least five independent pressure measurements must be available to derive the entire airdata state. Using five sensors in the surface pressure sensor matrix 120 to estimate the airdata is equivalent to a higher order spline fit and results in an estimation and evaluation algorithm that is sensitive to noise in the measured pressures. However, if an additional sixth sensor is provided, the result is to mitigate the noise sensitivity, increase redundancy options, and results in a FADS system 100 that gives overall superior performance.

FIG. 2 is a front view of the X-33 flight vehicle 110 of FIG. 1 illustrating the preferred configuration of the surface pressure sensor matrix 120 on the nose 205 of the vehicle 110. Moreover, FIG. 3 is a side view of the nose 205 in FIG. 2 further showing the location of the six sensors of the surface pressure sensor matrix 120.

Referring to FIGS. 2 and 3, five sensors are located on the nose 205 and a sixth sensor 210 is located slightly under the nose 205. Four of the sensors, including the sixth sensor 210, are located along the meridian 220. As further explained below, this layout permits the calculations for angle of attack to be decoupled from the calculations for angle of sideslip using the method and apparatus of the present invention. In addition, this sensor layout is designed to give good sensitivity for local angles of attack varying from −20° to 45°, and angles of sideslip up to ±20°.

FIG. 4 is a perspective view of the nose 205 of the X-33 flight vehicle 110 shown in FIGS. 2 and 3 illustrating the coordinate angles for the surface pressure sensor matrix 120. The cone angle 410 ($\lambda$) is the total angle the normal to the surface 420 makes with respect to the longitudinal axis 430 (x axis) of the flight vehicle 110. The clock angle 440 ($\phi$) is the clockwise angle looking aft around the axis of symmetry 450 starting at the bottom of the flight vehicle 110. Using these coordinate angles, the nominal clock and cone angles of the six sensors in the surface pressure sensor matrix 120 are tabulated in Table 1:

TABLE I

| FADS Ports Clock and Cone Angles | | |
|---|---|---|
| Port # | $\phi_i^\circ$ | $\lambda_i^\circ$ |
| 1 | 180 | 20 |
| 2 | 270 | 20 |
| 3 | 0 | 0 |
| 4 | 90 | 20 |
| 5 | 0 | 20 |
| 6 | 0 | 45 |

Referring again to FIG. 1, the above-described surface pressure sensor matrix 120 is connected to a pressure distribution interface 130. Typically, this interface 130 is a device that transforms analog measurements into digital data, such as an analog to digital (A/D) converter. However, this example is only one of several possible configurations that one skilled in the art would recognize.

Through the interface 130, the surface pressure sensor matrix 120 is connected to the airdata estimation and evaluation system 140. This system 140 inputs measurements from the surface pressure sensor matrix 120 and estimates and evaluates airdata.

This computed airdata is sent to an airdata processor 145 that determines whether a physical change in the parameters the flight vehicle 110 are necessary. If so, then the control system 150 instructs the attitude controller 160, the velocity controller 170 or other vehicle system to effect the change. For example, the airdata processor may instruct the control system 150 to change the flight vehicle's 110 orientation, velocity or other physical parameter requires adjustment.

In response to the decision of the airdata processor 145, the control system 150 sends control signals to one or more of the attitude controller 160 and the velocity controller 170. Both of these controllers may be used to physically change the control surfaces, engine thrust or other aspect of the flight vehicle's 110 flight parameters. Moreover, the airdata processor 145 may send the computed airdata to the instrumentation system and navigational system of the flight vehicle 110. Several other uses of the computed airdata are possible, as can be appreciated by those of ordinary skill in the art.

1. Airdata Estimation and Evaluation System

Figure 5:
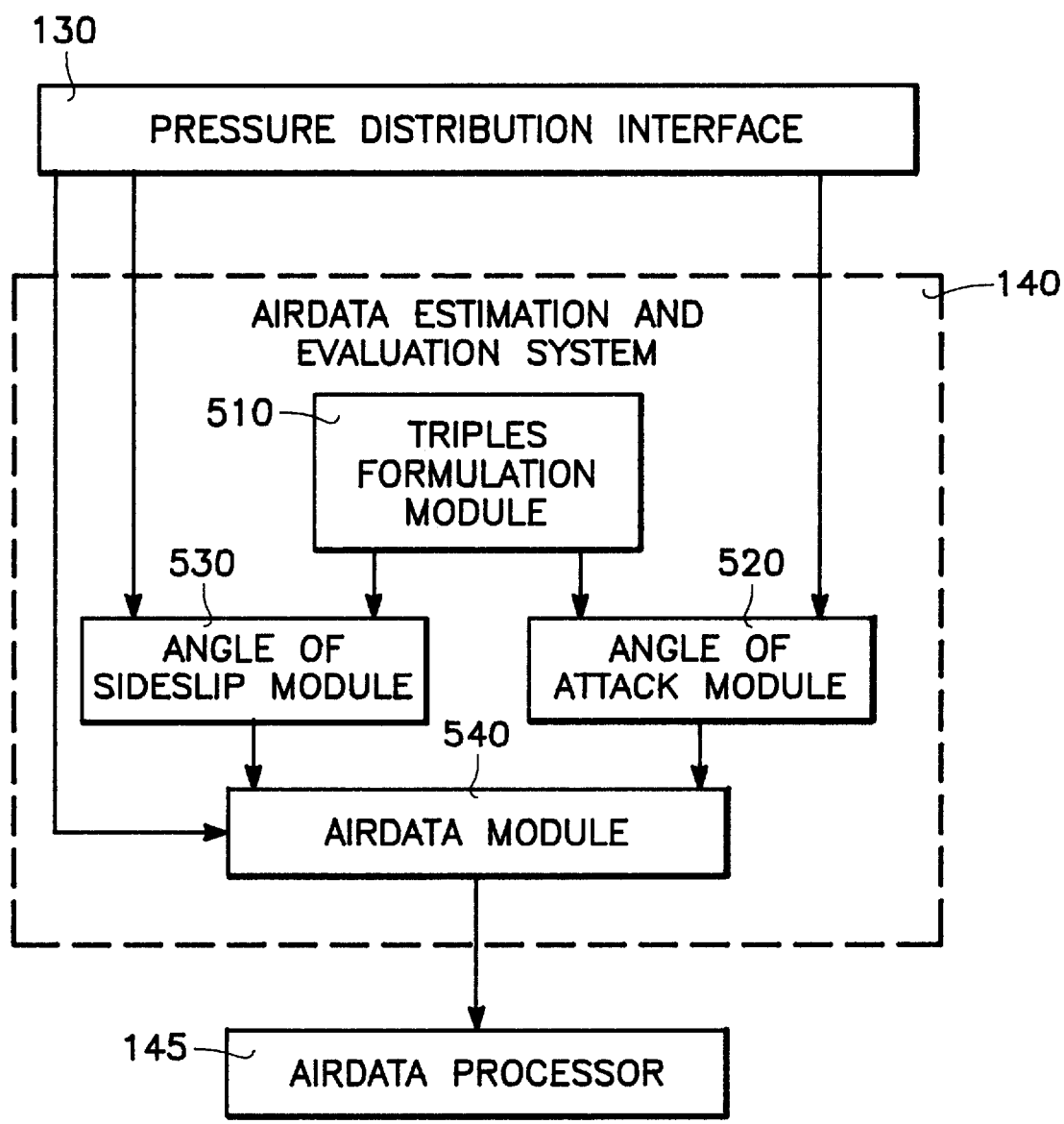
FIG. 5 is an overview structural block diagram of the airdata estimation and evaluation system shown in FIG. 1.

FIG. 5 is an overview structural block diagram of the airdata estimation and evaluation system 140 shown in FIG. 1. The system 140 includes a triples formulation module 510, an angle of attack (AOA) module 520, an angle of sideslip (AOS) module 530 and an airdata module 540. As described above, the inputs to the system 140 are the pressure distribution interface 130 and the output of the system 140 is the airdata processor 145.

The purpose of the airdata estimation and evaluation system 140 is to evaluate and estimated airdata given the surface pressure sensor matrix 120. This estimation and evaluation is accomplished by extracting airdata from the nonintrusive surface pressure measurements using an aerodynamic or flow model equation. In order to be useful, this flow model equation must capture the salient features of the flow and be valid over a large Mach number range. Moreover, the flow model equation must be simple enough to be inverted in real-time so that the airdata can be extracted.

To solve the problem of describing a complex flow scenario with a simple model, the flow model equation of the present invention was derived as a splice of the closed-form potential flow solution for a blunt body, applicable at low speeds. Furthermore, a modified Newtonian flow model, applicable at hypersonic speeds, was spliced with the potential flow solution. Both the potential flow and modified Newtonian flow describe the measured pressure coefficient in terms of the local surface incidence angle.

In order to blend these two solutions over a large range of Mach numbers, a calibration parameter E was used. This parameter must be empirically calibrated to allow for the effects of flow compression, body shape, and other systematic effects such as shock wave compression or Prandtl-Meyer expansion on the forebody. However, once ε is calculated it can be use for that particular flight vehicle.

The flow model equation for the present invention is:

$$p_i = q_c [\cos^2(\theta_i) + \epsilon \sin^2(\theta_i)] + P_\infty \quad (1)$$

Since equation (1) is derived from the potential and Newtonian flow around a blunt body, it is most valid near the vehicle stagnation point. Accordingly, the preferred location for the surface pressure sensor matrix 120 is at the nose of the flight vehicle 110.

In equation (1), $\theta_i$ is the flow incidence angle between the surface normal at the $i^{th}$ port and the velocity vector. The flow incidence angle is related to the local (or effective) angle-of-attack $\alpha_e$, and angle-of-sideslip $\beta_e$, by the equation:

$$\cos(\theta_i) = \cos(\alpha_e)\cos(\beta_e)\cos(\lambda_i) + \sin(\beta_e)\sin(\phi_i)\sin(\lambda_i) + \sin(\alpha_e)\cos(\beta_e)\cos(\phi_i)\sin(\lambda_i) \quad (2)$$

Referring to FIG. 4 and equation (2), the cone angle λ is the total angle the normal surface makes with respect to the longitudinal axis of the nosecap. The clock angle φ is the clockwise angle looking aft around the axis of symmetry starting at the bottom of the fuselage. The remaining parameters in equation (1) are impact pressure qc and the freestream static pressure $P_\infty$. Using these four basic parameters, $\alpha_e$, $\beta_e$, $q_c$, and $P_\infty$, most other airdata quantities of interest may be directly calculated.

In addition to the calibration for ε, the local flow incidence angles, $\alpha_e$, and $\beta_e$, must be related by calibrations to the true freestream flow angles. These flow-angle calibrations account for such additional systematic effects as bow shock flow deflection and body-induced upwash and sidewash. A preliminary set of calibrations for the X-33 flight vehicle has been derived using wind tunnel data. In a similar manner, these calibrations may be empirically determined for other types of flight vehicles.

a. Triples Formulation Module

The flow model equation of equations (1) and (2) is inherently non-linear in terms of the state parameters and can not be directly inverted. As discussed in the Background section, a non-linear regression method in which the equations are recursively linearized and inverted using iterative least-squares has been used with marginal success. A major drawback, however, is that the algorithm is highly unstable and thus requires complex software patches just to maintain stability.

The present invention includes a new system and method to solve equations 1 and 2 to thereby extract airdata. One way this is accomplished is by using the airdata estimation and evaluation system 140. At the heart of the airdata estimation and evaluation system 140 is the triples formulation module 510.

Referring again to FIG. 5, the triples formulation module 510 is a part of the airdata estimation and evaluation system 140. The triples formulation module 510 takes the flow model equation (equation (1)) and transforms it into a triples formulation equation. This is done by taking a strategic combination of three surface pressure readings from the surface pressure sensor matrix 120 such that the flow angularity states are decoupled from the static and impact pressure states and the aerodynamic calibration.

Significantly, taking the differences of this strategic selection of three surface pressures (referred to as "triples") eliminates the pressure related states, $q_c$, $P_\infty$, and ε from equation (1) (the flow model equation). This is a significant and novel discovery permitting a more stable and direct solution of equation (1) than achieved by existing algorithms. The mathematics of the triples formulation module 510 as well as of all the other modules contained in the airdata estimation and evaluation system 140 is detailed below in the "Mathematical Description of the Invention" section.

After the flow model equation has been transformed, the resulting triples formulation equation is:

$$\Gamma_{ik}\cos^2\theta_j + \Gamma_{ji}\cos^2\theta_k + \Gamma_{kj}\cos^2\theta_i = 0 \quad (3)$$

where, $$\Gamma_{ik} = (p_i - p_k), \; \Gamma_{ji} = (p_j - p_i), \; \Gamma_{kj} = (p_k - p_j) \quad (4)$$

and $p_i$, $p_j$, and $p_k$ are the pressures used in the data triple.

b. Angle of Attack (AOA) Module

The triples formulation equation is sent to the AOA module 520, for computation of the angle of attack α. This is calculated using the triples formulation equation and the pressure quantities supplied by the surface pressure sensor matrix 120 through the pressure distribution interface 130.

In equation (3), the local angle of attack can be decoupled from the local angle of sideslip by using only pressure ports aligned along the vertical meridian 220 where φ=0° or φ=180°. In this geometry arrangement terms related to angle of sideslip fall out of equation (3). Thus, for $|\alpha| \leq 45°$ the solution for α is:

$$\alpha = \frac{1}{2}\tan^{-1}\left[\frac{A}{B}\right] \quad (5)$$

where $$A = \Gamma_{ik}\sin^2\lambda_j + \Gamma_{ji}\sin^2\lambda_k + \Gamma_{kj}\sin^2\lambda_i$$

$$B = \Gamma_{ik}\cos\phi_j\sin\lambda_j\cos\lambda_j + \Gamma_{ji}\cos\phi_k\sin\lambda_k\cos\lambda_k + \Gamma_{kj}\cos\phi_i\sin\lambda_i\cos\lambda_i \quad (6)$$

When $|\alpha| > 45°$ the correct solution is given by the complement of equation 5:

$$\alpha = \frac{1}{2}\left(\pi - \tan^{-1}\left[\frac{A}{B}\right]\right) \quad (7)$$

For the surface pressure sensor distribution 120 there are four possible independent combinations of α-triples on the vertical meridian. The clock and cone angles corresponding to these triples combinations are presented in Table II:

TABLE II

Clock and Cone Angles of the Angle-of-Attack Triples

| Triple # | $\phi_i°$ | $\lambda_i°$ | $\phi_j°$ | $\lambda_j°$ | $\phi_k°$ | $\lambda_k°$ |
|---|---|---|---|---|---|---|
| 1 | 0 | 0 | 0 | 20 | 180 | 20 |
| 2 | 0 | 0 | 0 | 20 | 0 | 45 |
| 3 | 0 | 0 | 180 | 20 | 0 | 45 |
| 4 | 0 | 20 | 180 | 230 | 0 | 25 |

In the preferred embodiment, the output angle of attack is the mean of the angle of attack values computed using the four individual triples. This averaging procedure provides a measure of noise rejection for the airdata estimation and evaluation system 140. Clearly, if one of the sensors in the vertical meridian 220 of the surface pressure sensor matrix 120 is deemed unusable and is weighted out of the algorithm, then only one valid triple remains for computing the output angle of attack.

c. Angle of Sideslip (AOS) Module

After the angle of attack α has been estimated, the angle of sideslip β is evaluated by the AOS module 530. This module uses the triples formulation equation from the triples formulation module 510, the output angle of attack from the AOA module 520 and pressure quantities from the surface pressure sensor matrix 120 to calculate the angle of sideslip.

The AOS module 530 computes the angle of sideslip by using a combination of the available pressure sensors in the surface pressure sensor matrix 120, other than the obvious set in which all three sensors lie on the vertical meridian. The result is a quadratic equation in tan β:

$$A' \tan^2\beta + 2B' \tan\beta + C' = 0 \quad (8)$$

where $$A' = \{\Gamma_{ik}b_j^2 + \Gamma_{ji}b_k^2 + \Gamma_{kj}b_i^2\}$$

$$B' = \{\Gamma_{ik}a_jb_j + \Gamma_{ji}a_kb_k + \Gamma_{kj}a_ib_i\}$$

$$C' \{\Gamma_{ik}a_j^2 + \Gamma_{ji}a_k^2 + \Gamma_{kj}a_i^2\} \quad (9)$$

and $$a_{\{ijk\}} = \cos\alpha\cos\lambda_{\{ijk\}} + \sin\alpha\sin\lambda_{\{ijk\}}\cos\phi_{\{ijk\}},$$

$$b_{\{ijk\}} = \sin\lambda_{\{ijk\}}\sin\phi_{\{ijk\}} \quad (10)$$

Because equation (8) is a quadratic equation, there are two solutions. In general, the correct estimation can be computed by picking the value of β that is nearest to zero. However, there are times when this will not work, and the full mathematical procedure for picking the correct root is detailed below in the "Mathematical Description of the Invention" section.

In a preferred embodiment, the output angle of sideslip is calculated as the mean of the values computed using the four individual triples. Clearly, if one of the ports along the vertical meridian is deemed unusable and is weighted out of the algorithm, then only one valid triple remains for computing the output angle of sideslip.

d. Airdata Module

Once the values of the output angle of attack and the output angle of sideslip ($\alpha_e$ and $\beta_e$) have been computed, then the incidence angles at all of the pressure ports can be evaluated, and only the calibration parameter ϵ, the freestream static pressure $p_\infty$, and the impact pressure $q_c$ remain as unknowns. However, ϵ is implicitly a function of $p_\infty$ and $q_c$ and the resulting system of equations is non-linear. Consequently, the solutions for $p_\infty$ and $q_c$ must be extracted iteratively. These iterative computations are performed by the airdata module 540. The airdata module 540 accepts input from both the AOA module 520 and the AOS module 540.

Defining the Matrices:

$$M_{(j)} = \begin{bmatrix} \left( \begin{array}{c} \cos^2(\theta_1) + \\ \epsilon^{(j)}\sin^2(\theta_1) \end{array} \right) & 1 \\ \vdots & \vdots \\ \left( \begin{array}{c} \cos^2(\theta_6) + \\ \epsilon^{(j)}\sin^2(\theta_6) \end{array} \right) & 1 \end{bmatrix}, Q = \begin{bmatrix} q_1 & \cdots & 0 \\ \vdots & \ddots & \vdots \\ 0 & \cdots & q_6 \end{bmatrix} \quad (11)$$

the flow model equation (equation (1)) can be used to develop an iterative estimator of the form:

$$\begin{bmatrix} \hat{q}_c \\ \hat{p}_\infty \end{bmatrix}_{(j+1)} = \{[M_{(j)}^T Q M_{(j)}]^{-1} M_{(j)}^T Q\} \begin{bmatrix} p_1 \\ \vdots \\ p_6 \end{bmatrix} \quad (12)$$

The subscript (j) refers the result of the $j'^{th}$ iteration. The notation $M_{(j)}$ refers to the matrix of equation 12 with ϵ being evaluated using the values for Mach number resulting from the previous iteration. The $q_i$ terms are weights which have a nominal value of 1.0. Setting the value of $q_i$ to zero weights the $i'^{th}$ pressure reading out of the algorithm.

Given $q_c$ and $p_\infty$, the Mach number can be computed using normal one-dimensional fluid mechanics relationships. For subsonic speeds, the Mach number can be computed using isentropic flow laws, where for γ=1.4:

$$\frac{qc}{P_\infty} = [1 + .2 M_\infty^2]^{3.5} - 1 \quad (13)$$

For supersonic speeds, the solution is computed using the Rayleigh pitot equation that is derived from adiabatic normal shock wave relationships. For γ=1.4:

$$\frac{q_c}{P_\infty} = \frac{166.92 M_\infty^7}{[7 M_\infty^2 - 1]^{2.5}} - 1 \quad (14)$$

Equation (14) is solved using a Taylor's series expansion and a reversion of series to obtain Mach number.

For high Mach numbers, a very significant temperature rise occurs across the bow shock wave and the fluid no longer behaves as a calorically perfect gas. The large temperature rise across the shock wave causes vibrational modes of the air molecules to excite, which draws energy away from the flow. Thus, the stagnation temperatures actually encountered are considerably lower than those which would be computed if perfect gas calculations with γ=1.4 were used.

As a result of this non-adiabatic flow behavior, some error is expected to occur in the Mach number calculation using equation (14). Fortunately, because pressure is a mechanical quantity and depends primarily upon the mechanical aspects of the flow, influences caused by high temperature gas properties are secondary. Numerical analyses of equation (14) have shown that the error introduced is less than 0.2% for Mach numbers below 4.0.

The airdata computed as described above by the various modules of the airdata estimation and evaluation system 140 are then sent to the airdata processor 145. The airdata processor 145 uses the computed airdata to determine whether adjustments to physical parameters of the flight vehicle 110 are necessary. Examples of physical aspects of the flight vehicle are its velocity, attitude, altitude, and deflection of the control and flap surfaces. In addition, the airdata processor 145 may send the computed airdata to the instrumentation or navigational systems of the flight vehicle 110 before being sent to the control system 150 for adjustment of these flight parameters.

III. Functional Overview of the Invention

The airdata estimation and evaluation method of the present invention may be implemented in the airdata estimation and evaluation system 140 as a dedicated logic circuit or a field programmable gate array. Preferably, as shown in FIG. 1, the airdata system 140 may contain a microprocessor 142 and a memory 144 for storing and executing software coded with this method.

The memory 144 may be a hard disk drive, CD-ROM, random access memory (RAM) or any other computer memory device or medium capable of storing the software or instructions containing the method of the present invention. The microprocessor executes the method stored in the memory 144.

The airdata method of the present invention is capable of interfacing with the FADS system 100 by receiving pressure measurements from the surface pressure sensor matrix 120, computing necessary airdata, and sending the computed airdata to the airdata processor 145. The airdata processor 145 then uses the computed airdata to effect the necessary physical changes to the flight vehicle 110.

Similar to the airdata estimation and evaluation system 140, the airdata estimation and evaluation method includes a triples formulation function, an angle of attack function, an angle of sideslip function and an airdata function.

The mathematical details of the equations given thus far and below are developed more fully in the section below entitled, "Mathematical Description of the Invention."

1. Triples Formulation Function

Figure 6:
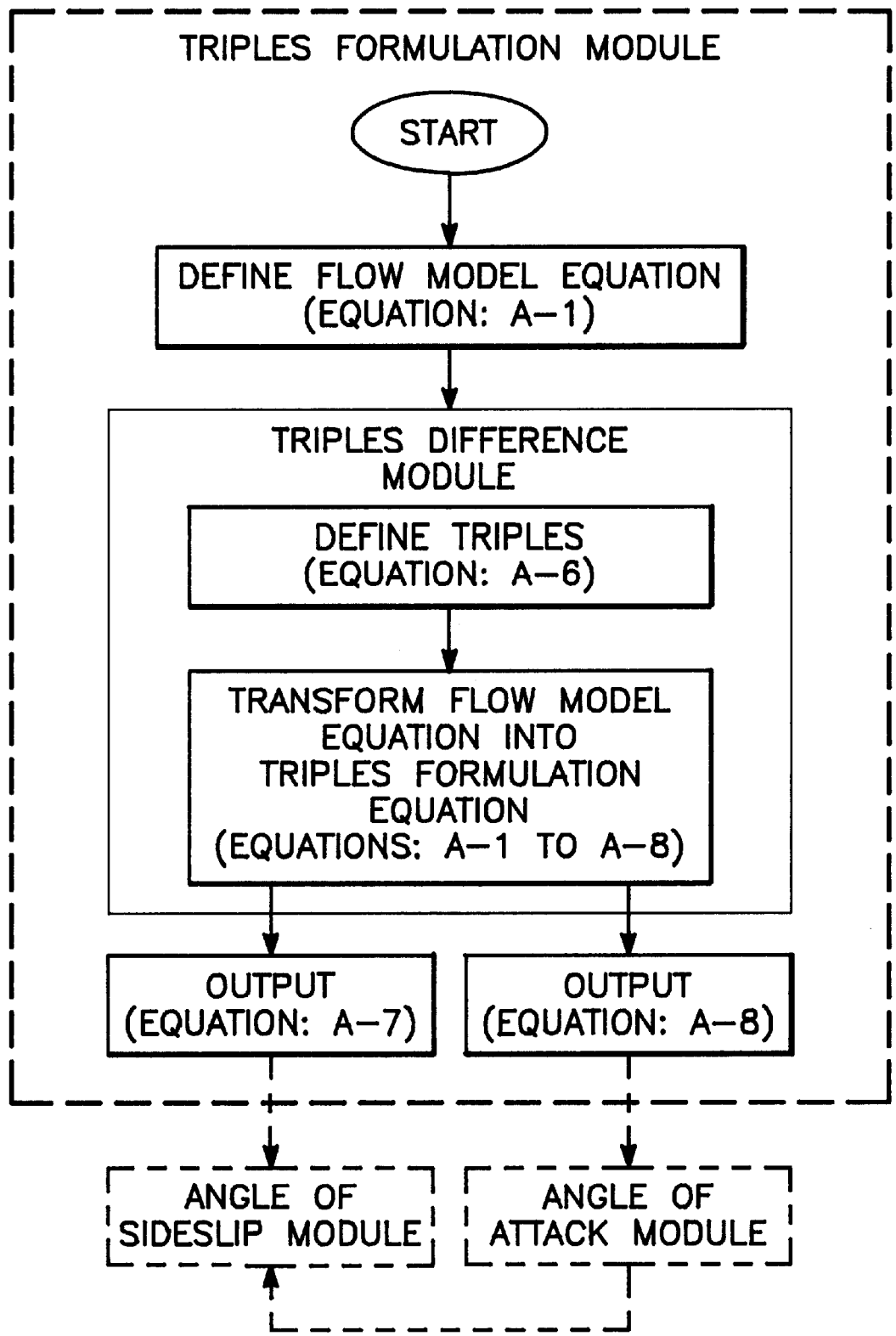
FIG. 6 is a detailed functional flow diagram of the triples formulation function of the airdata estimation and evaluation system of FIGS. 1 and 5.

FIG. 6 is a detailed functional flow diagram of the method that is preferably contained in the triples formulation module 510. The method transforms a flow model equation into a triples formulation equation using pressure quantities from the surface pressure sensor matrix 120.

The function starts with a given flow model equation. This equation is given by:

$$p_i = q_c[\cos^2(\theta_i) + \epsilon \sin^2(\theta_i)] + P_\infty \qquad (15)$$

Next, the function determines the triples, which are defined as:

$$\Gamma_{ik} = p_i - p_k, \ \Gamma_{ji} = p_j - p_i, \ \Gamma_{kj} = p_k - p_j \qquad (16)$$

After the triples have been computed, the triples formulation equation is calculated. Substituting and collecting terms yields the triples formulation equation:

$$\Gamma_{ik}[a_j + b_j \tan \beta]^2 + \Gamma_{ji}[a_k + b_k \tan \beta]^2 + \Gamma_{kj}[a_i + b_i \tan \beta]^2 = 0 \qquad (17)$$

Equation (17) is significant because the equation is in terms of the measured pressures from the surface pressure sensor matrix 120 only.

The triple formulation function then sends the equation (17) to the angle of attack function and the angle of sideslip function.

2. Angle of Attack Function

Figure 7:
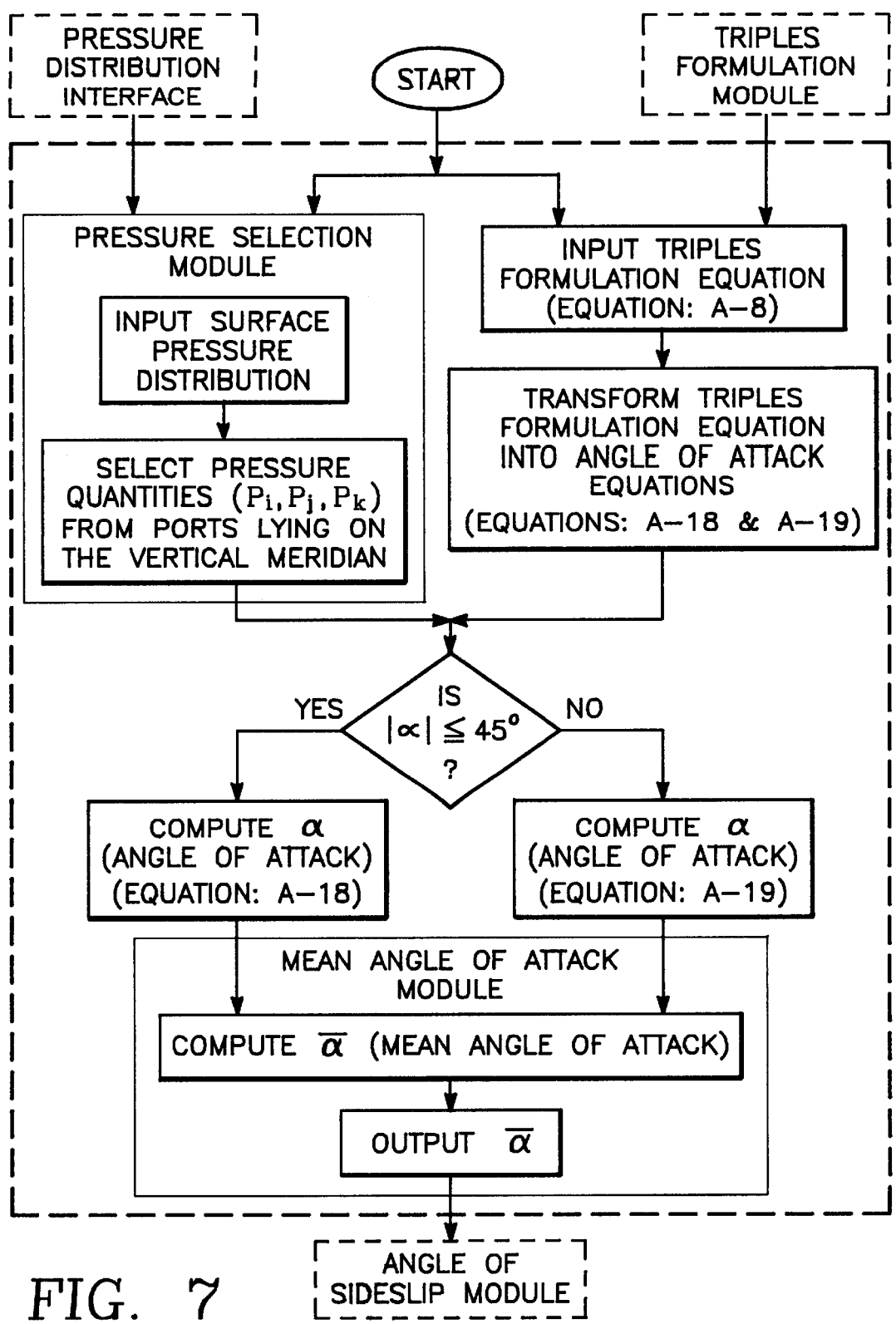
FIG. 7 is a detailed functional flow diagram of the angle of attack function of the airdata estimation and evaluation system of FIGS. 1 and 5.

FIG. 7 is a detailed functional flow diagram of the angle of attack function of the airdata estimation and evaluation system of FIGS. 1 and 5. The function begins by receiving the surface pressure distribution from the surface pressure sensor matrix 120. The function then selects pressure quantities, $p_i$, $p_j$, $p_k$, from pressure ports lying on the vertical meridian 220, as shown in FIG. 2.

Meanwhile, the function receives the triples formulation equation, equation (17), from the triples formulation function and transforms this equation into the angle of attack equations. These angle of attack equations are given as:

$$\alpha = \frac{1}{2} \tan^{-1}\left[\frac{A}{B}\right] \qquad (18)$$

and, $$\alpha = \frac{1}{2}\left(\pi - \tan^{-1}\left[\frac{A}{B}\right]\right) \qquad (19)$$

The function then determines whether the magnitude of angle of attack, $\alpha$, is less than or equal 45 degrees. If yes, and $|\alpha| \leq 45°$, equation (18) picks the correct root. However, if no, and $|\alpha| > 45°$, then the correct root is given by equation (19). These computations of the angle of attack are performed for each of the pressure ports selected by the function as previously described.

In a preferred embodiment, the function next computes the mean angle of attack using the individually computed angles of attack. This mean angle of attack is then outputted to the angle of sideslip function.

3. Angle of Sideslip Function

Figure 8:
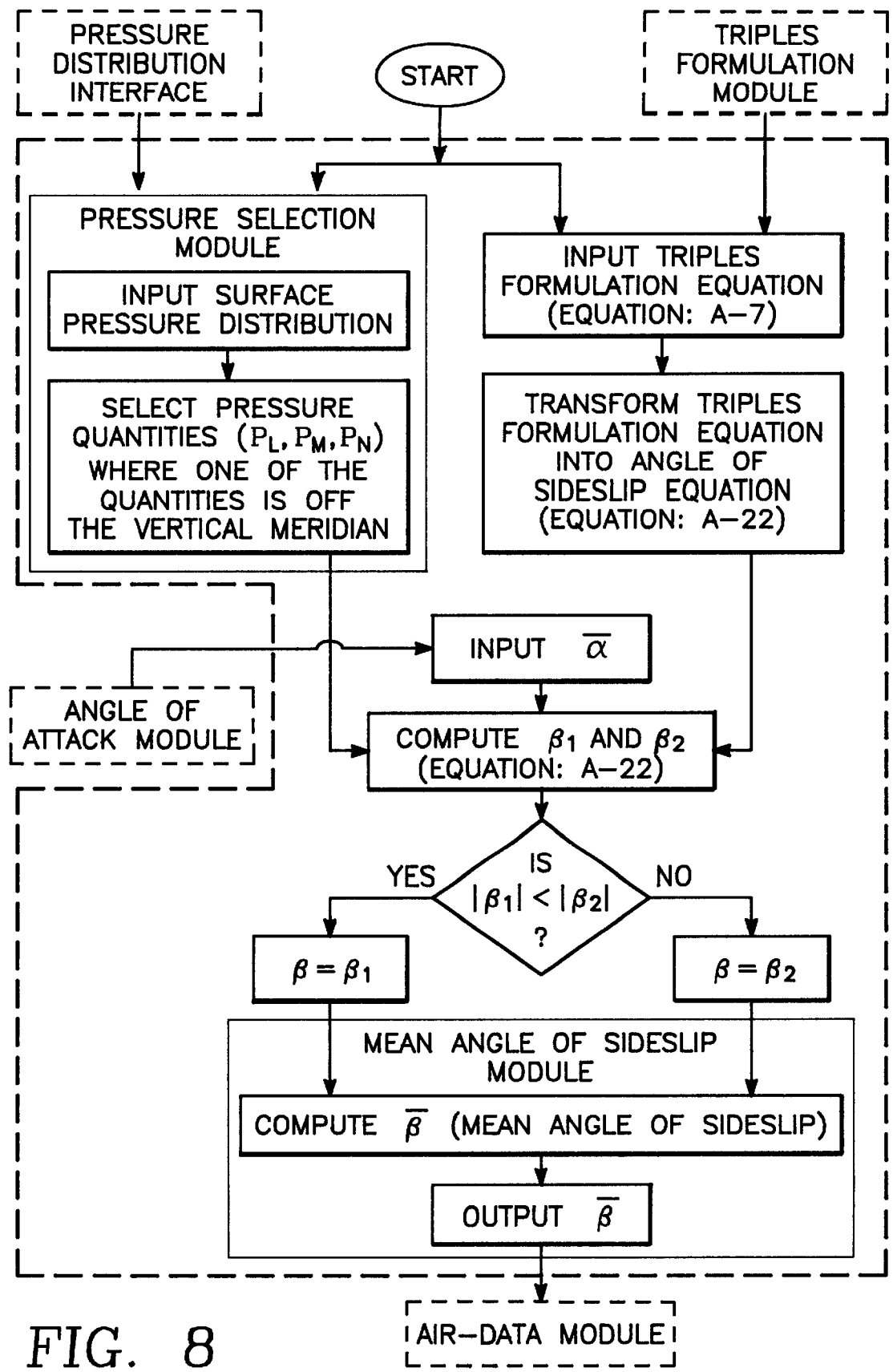
FIG. 8 is a detailed functional flow diagram of the angle of sideslip function of the airdata estimation and evaluation system of FIGS. 1 and 5.

FIG. 8 is a detailed functional flow diagram of the angle of sideslip function of the airdata estimation and evaluation system of FIGS. 1 and 5. The function starts by receiving the pressure distribution from the surface pressure sensor matrix 120. Next, the pressure quantities, $p_i$, $p_j$, $p_k$, are selected from the pressure ports such that one of the pressure quantities is off the vertical meridian 220.

Meanwhile, the function receives the triples formulation equation, equation (17), from the triples formulation function. This equation is transformed by the function into the angle of sideslip equations, given by the quadratic equation:

$$A' \tan^2\beta + 2B' \tan \beta + C' = 0 \qquad (20)$$

Next, the computed angle of attack is received from the angle of attack function. Because equation (22) is a quadratic equation, two values of the angle of sideslip, $\beta_1$ and $\beta_2$ are computed from equation (22). If the magnitude of $\beta_1$ is less than the magnitude of $\beta_2$, then the solution is equal to $\beta_1$. Otherwise, the solution is equal to $\beta_2$. The value of the angle of sideslip is computed for all pressure values selected from the pressure distribution as described above.

In a preferred embodiment, the computed angle of sideslip is calculated as the mean of all the computed values of the angle of sideslip for each pressure port. This computed mean angle of sideslip is then outputted to the airdata function.

4. Airdata Function

Figure 9A:
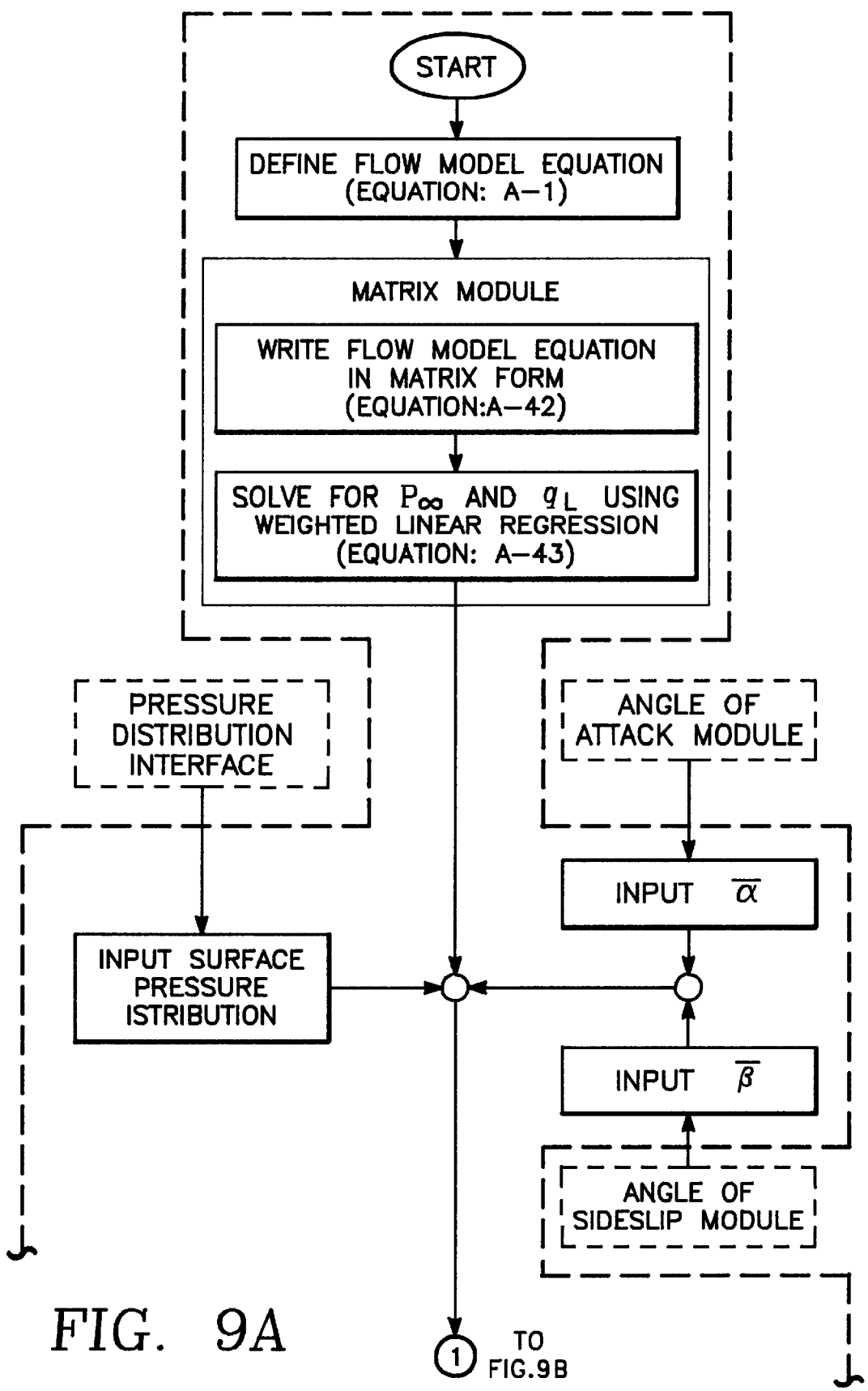
FIG. 9 is a detailed functional flow diagram of the airdata function of the airdata estimation and evaluation system of FIGS. 1 and 5.
Figure 9B:
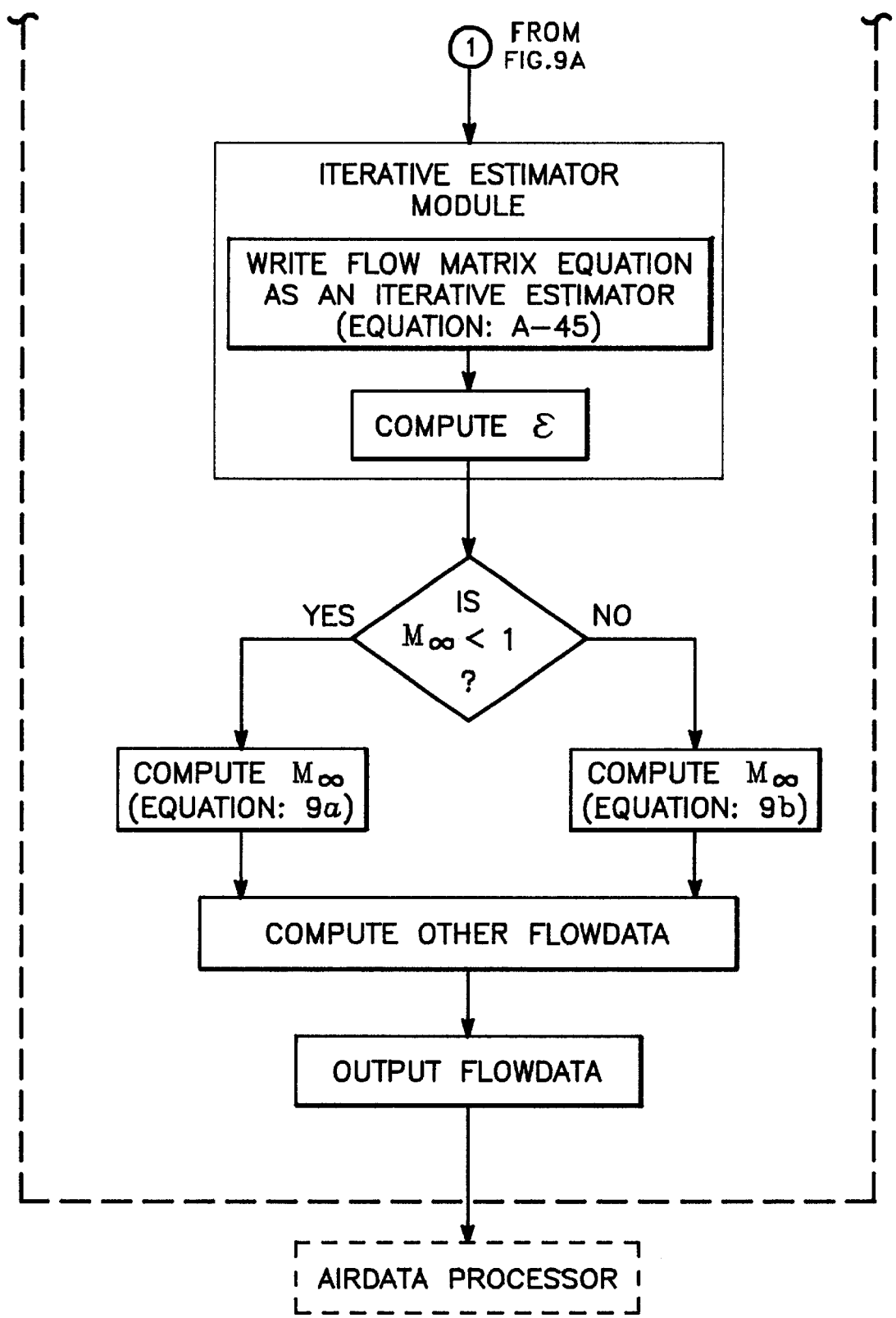

FIG. 9 is a detailed functional flow diagram of the airdata function of the airdata estimation and evaluation system of FIGS. 1 and 5. The function starts with the given flow model equation, equation (1):

$$p_i = q_c[\cos^2(\theta_i) + \epsilon \sin^2(\theta_i)] + P_\infty \qquad (1)$$

Once the values of angle of attack and angle of sideslip have been calculated, then the incidence angles at all of the ports can be evaluated, and only $\epsilon$, $p_\infty$, and $q_c$ remain as unknowns in the pressure equations. Assuming that n pressure measurements are to be used, the flow model equation, equation (1), can be written in matrix form with static and impact pressure broken-out as variables:

$$\begin{bmatrix} p_1 \\ \vdots \\ p_n \end{bmatrix} = \begin{bmatrix} \begin{pmatrix} \cos^2(\theta_1) + \\ \varepsilon\sin^2(\theta_1) \end{pmatrix} & 1 \\ \vdots & \vdots \\ \begin{pmatrix} \cos^2(\theta_n) + \\ \varepsilon\sin^2(\theta_n) \end{pmatrix} & 1 \end{bmatrix} \begin{bmatrix} q_c \\ P_\infty \end{bmatrix} \quad (21)$$

Next, the function solves for the static pressure, $q_c$, and the impact pressure, $p_\infty$ using weighted linear regression. The result is:

$$\begin{bmatrix} \hat{q}_c \\ \hat{P}_\infty \end{bmatrix} = \frac{\begin{bmatrix} \sum_{i=1}^n q_i & -\sum_{i=1}^n q_i(\Omega_i) \\ -\sum_{i=1}^n q_i(\Omega_i) & \sum_{i=1}^n q_i(\Omega_i)^2 \end{bmatrix}\begin{bmatrix} \sum_{i=1}^n (\Omega_i)q_iP_i \\ \sum_{i=1}^n q_i P_i \end{bmatrix}}{\left[\sum_{i=1}^n q_i\right]\left[\sum_{i=1}^n q_i(\Omega_i)^2\right] - \left[\sum_{i=1}^n q_i(\Omega_i)\right]^2} \quad (22)$$

where $\Omega_i = \cos^2(\theta_i) + \varepsilon \sin^2(\theta_i)$.

Meanwhile, the pressure distribution is received from the surface pressure sensor matrix 120. In addition, the computed angle of attack and the computed angle of sideslip are received from the angle of attack function and the angle of sideslip function, respectively.

Next, the function writes equation (22) as an iterative estimator, given as:

$$\begin{bmatrix} \hat{q}_c \\ \hat{P}_\infty \end{bmatrix}_{(j+1)} = \{[M_{(j)}^T Q M_{(j)}]^{-1} M_{(j)}^T Q\}\begin{bmatrix} p_1 \\ \vdots \\ p_n \end{bmatrix} \quad (23)$$

From equation (23) the function computes θ iteratively using the values for Mach number resulting from the previous iteration for $p_\infty$ and $q_c$.

If the Mach number is estimated to be less than one, for air ($\gamma = 1.4$) the Mach number is computed using the subsonic equation from above:

$$\frac{qc}{P\infty} = [1 + .2\, M_\infty^2]^{3.5} - 1 \quad (13)$$

For supersonic speeds, the solution is computed using the Rayleigh pitot equation that is derived from adiabatic normal shock wave relationships. For $\gamma = 1.4$:

$$\frac{q_c}{P_\infty} = \frac{166.92\, M_\infty^7}{[7 M_\infty^2 - 1]^{2.5}} - 1 \quad (14)$$

The function solves equation (14) for Mach number using a Taylor's series expansion and a reversion of series.

Using these computed airdata parameters, other airdata may be calculated as needed by the FADS system 100. This computed airdata is then outputted to the airdata processor 145 that determines it response as described above.

IV. Mathematical Description of the Invention

Following are the mathematical details of the apparatus and method of the present invention. As discussed above, the basic concept of the airdata estimation and evaluation system is that airdata states are related to the surface pressures by a flow model equation that captures salient features of the flow and is valid over a large Mach number range. The resulting flow model equation takes the form:

$$p_i = q_c[\cos^2(\theta_i) + \varepsilon \sin^2(\theta_i)] + P_\infty \quad (A\text{-}1)$$

where $$\cos(\theta_i) = \cos(\alpha_e)\cos(\beta_e)\cos(\lambda_i) + \sin(\beta_e)\sin(\phi_i)\sin(\lambda_i) + \sin(\alpha_e)\cos(\beta_e)\cos(\phi_i)\sin(\lambda_i) \quad (A\text{-}2)$$

Equations (A-1) and (A-2) are the same as equations 1 and 2 as described above.

Defining the terms:

$$a_i = \cos\alpha_e \cos\lambda_i + \sin\alpha_e \sin\lambda_i \cos\phi_i,\ b_i = \sin\lambda_i \sin\phi_i \quad (A\text{-}3)$$

equation A-2 reduces to $$\cos(\theta_i) = a_i \cos(\beta_e) + b_i \sin(\beta_e) \quad (A\text{-}4)$$

a. The Triples Formulation

By using equation (A-1) to take strategic combinations of three pressures("triples"), the result is that the impact pressure, static pressure, and calibration parameter are decoupled from the angle of attack α and angle of sideslip β.

$$\frac{p_i - p_j}{p_j - p_k} = \frac{q_c\{\cos^2\theta_i + \varepsilon\sin^2\theta_i\} + P_\infty - [q_c\{\cos^2\theta_j + \varepsilon\sin^2\theta_j\} + P_\infty]}{q_c\{\cos^2\theta_j + \varepsilon\sin^2\theta_j\} + P_\infty - [q_c\{\cos^2\theta_k + \varepsilon\sin^2\theta_k\} + P_\infty]} \quad (A\text{-}5)$$

$$= \frac{\{(1-\varepsilon)\cos^2\theta_i + \varepsilon\} - \{(1-\varepsilon)\cos^2\theta_j + \varepsilon\}}{\{(1-\varepsilon)\cos^2\theta_j + \varepsilon\} - \{(1-\varepsilon)\cos^2\theta_k + \varepsilon\}}$$

$$= \frac{\cos^2\theta_i - \cos^2\theta_j}{\cos^2\theta_j - \cos^2\theta_k}$$

Expanding equation (A-5) and defining $$\Gamma_{ik} \equiv p_i - p_k,\ \Gamma_{ji} \equiv p_j - p_i,\ \Gamma_{kj} \equiv p_k - p_j \quad (A\text{-}6)$$

equation (A-5) reduces to $$\Gamma_{ik}\cos^2\theta_j + \Gamma_{ji}\cos^2\theta_k + \Gamma_{kj}\cos^2\theta_i 0 \quad (A\text{-}7)$$

Substituting in from equation (A-4), dividing by $\cos^2\beta$ ($\beta \neq \pm 90°$) and collecting terms, equation (A-7) becomes $$\Gamma_{ik}[a_j + b_j \tan\beta]^2 + \Gamma_{ji}[a_k + b_k \tan\beta]^2 + \Gamma_{kj}[a_i + b_i \tan\beta]^2 = 0 \quad (A\text{-}8)$$

It is important to note that in equation (A-8) the angle of attack α and the angle of sideslip β have been written as a function of the measured pressure only. Significantly, the impact pressure $q_c$, the calibration parameter $\varepsilon$, and static pressure $P_\infty$, have been decoupled.

b. Angle of Attack Solution

Angle of attack is decoupled from angle of sideslip using a "meridian solution", where, along the vertical meridian $\phi = 0°$ and $\phi + \pm 180°$. Equation (A-8) thereby reduces to:

$$\Gamma_{ik}[\cos\alpha\cos\lambda_j + \sin\alpha\sin\lambda_j\cos\phi_j]^2 + \Gamma_{ji}[\cos\alpha\cos\lambda_k + \sin\alpha\sin\lambda_k\cos\phi_k]^2 + \Gamma_{kj}[\cos\alpha\cos\lambda_i + \sin\alpha\sin\lambda_i\cos\phi_i]^2 = 0 \quad (A\text{-}9)$$

Factoring $\cos\alpha$ ($\alpha \neq \pm 90°$) out of equation (A-9), $$\Gamma_{ik}[\cos\lambda_j + \tan\alpha\sin\lambda_j\cos\phi_j]^2 + \Gamma_{ji}[\cos\lambda_k + \tan\alpha\sin\lambda_k\cos\phi_k]^2 + \Gamma_{kj}[\cos\lambda_i + \tan\alpha\sin\lambda_i\cos\phi_i]^2 = 0 \quad (A\text{-}10)$$

Expanding the squares, the result is a quadratic expression in $\tan\alpha$, $$[\Gamma_{ik}\sin^2\lambda_j + \Gamma_{ji}\sin^2\lambda_k + \Gamma_{kj}\sin^2\lambda_i]\tan^2\alpha +$$

$2[\Gamma_{ik} \cos \lambda_j \sin \lambda_j \cos \phi_j + \Gamma_{ji} \cos \lambda_k \sin \lambda_k \cos \phi_k + \Gamma_{kj} \cos \lambda_i \sin \lambda_i \cos \phi_i] \tan \alpha +$ $[\Gamma_{ik} \cos^2 \lambda_j + \Gamma_{ji} \cos^2 \lambda_k + \Gamma_{kj} \cos^2 \lambda_i] = 0$ (A-11)

Equation (A-14) can be reduced further by noting that $\cos^2 \lambda = 1 - \sin^2 \lambda$ and $\Gamma_{jk} \cos^2 \lambda_j + \Gamma_{ji} \cos^2 \lambda_k + \Gamma_{kj} \cos^2 \lambda_i = \Gamma_{ik}(1-\sin^2 \lambda_j) + \Gamma_{ji}(1-\sin^2 \lambda_k) + \Gamma_{kj}(1-\sin^2 \lambda_i)$ $= \Gamma_{ik} + \Gamma_{ji} + \Gamma_{kj} - (\Gamma_{ik} \sin^2 \lambda_j + \Gamma_{ji} \sin^2 \lambda_k + \Gamma_{kj} \sin^2 \lambda_i)$ $= (p_i - p_k) + (p_j - p_i) + (p_k - p_j) - (\Gamma_{ik} \sin^2 \lambda_j + \Gamma_{ji} \sin^2 \lambda_k + \Gamma_{kj} \sin^2 \lambda_i)$ $= -(\Gamma_{ik} \sin^2 \lambda_j + \Gamma_{ji} \sin^2 \lambda_k + \Gamma_{kj} \sin^2 \lambda_i)$ (A-12)

Substituting Equation (A-12) into Equation (A-11), $[\Gamma_{ik} \sin^2 \lambda_j + \Gamma_{ji} \sin^2 \lambda_k + \Gamma_{kj} \sin^2 \lambda_i][\tan^2 \alpha - 1] +$ $2[\Gamma_{ik} \cos \lambda_j \sin \lambda_j \cos \phi_j + \Gamma_{ji} \cos \lambda_k \sin \lambda_k \cos \phi_k + \Gamma_{kj} \cos \lambda_i \sin \lambda_i \cos \phi_i] \tan \alpha = 0$ (A-13)

Defining, $A = (\Gamma_{ik} \sin^2 \lambda_j + \Gamma_{ji} \sin^2 \lambda_k + \Gamma_{kj} \sin^2 \lambda_i)$ $B = (\Gamma_{ik} \cos \phi_j \sin \lambda_j \cos \lambda_j + \Gamma_{ji} \cos \phi_k \sin \lambda_k \cos \lambda_k + \Gamma_{kj} \cos \phi_i \sin \lambda_i \cos \lambda_i)$ (A-14)

Equation (A-14) is written in the simple form $A[\tan^2 \alpha - 1] + 2B \tan \alpha = 0$ (A-13)

The "correct" solution is extracted from equation (A-15) by noting that:

$\tan^2 \alpha - 1 = \frac{\sin^2 \alpha - \cos^2 \alpha}{\cos^2 \alpha} = \frac{1 - 2\cos^2 \alpha}{\cos^2 \alpha} = -\frac{\cos 2\alpha}{\cos^2 \alpha}$ (A-16)

Substituting equation (A-16) into equation (A-15), and multiplying through by $\cos^2 \alpha$, $-A \cos 2\alpha + 2B \cos \alpha \sin \alpha = -A \cos 2\alpha + B \sin 2\alpha = 0$ (A-17)

and the solution for $\alpha$ is:

$\alpha = \frac{1}{2} \tan^{-1}\left[\frac{A}{B}\right]$ (A-18)

For $|\alpha| \leq 45°$, equation (A-18) picks the correct root; when $|\alpha| > 45°$ then the correct root is given by the complement of equation (A-18):

$\alpha = \frac{1}{2}\left(\pi - \tan^{-1}\left[\frac{A}{B}\right]\right)$ (A-19)

c. Angle of Sideslip Solution

Given the solution for angle of attack, a procedure similar to that of the previous section is followed for angle of sideslip. Expanding the squares in equation (A-7) and solving for like terms in tanβ, $[\Gamma_{ik}b_j^2 + \Gamma_{ji}b_k^2 + \Gamma_{kj}b_i^2]\tan^2 \beta + 2[\Gamma_{ik}a_jb_j + \Gamma_{ji}a_kb_kc + \Gamma_{kj}a_ib_i] \tan \beta + \Gamma_{ik}a_j^2 + \Gamma_{ji}a_k^2 + \Gamma_{kj}a_i^2 = 0$ (A-20)

Defining $A' = \{\Gamma_{jk}b_j^2 + \Gamma_{ji}b_k^2 + \Gamma_{kj}b_i^2\}$ $B' = \{\Gamma_{ik}a_jb_j + \Gamma_{ji}a_kb_k + \Gamma_{kj}a_ib_i\}$ $C' = \{\Gamma_{ik}a_j^2 + \Gamma_{ji}a_k^2 + \Gamma_{kj}a_i^2\}$ (A21)

Equation A-20 reduces to a quadratic equation in tan β

$A' \tan^2 \beta + 2B' \tan \beta + C' = 0$ (A-22)

The two solutions to equation A-22 are $\tan\beta_1, \tan\beta_2 = -\left[\frac{B'}{A'}\right] \pm \sqrt{\left[\frac{B'}{A'}\right]^2 - \left[\frac{C'}{A'}\right]}$ (A-23)

d. Root Selection Criteria for Angle of Sideslip

The relationship of $\tan[\beta_1]$ to $\tan[\beta_2]$ is developed by taking the product of the roots:

$\tan\beta_1 \tan\beta_2 =$ (A-24)

$\left(-\left[\frac{B'}{A'}\right] + \sqrt{\left[\frac{B'}{A'}\right]^2 - \left[\frac{C'}{A'}\right]}\right)\left(-\left[\frac{B'}{A'}\right] \sqrt{\left[\frac{B'}{A'}\right]^2 - \left[\frac{C'}{A'}\right]}\right) = \frac{C'}{A'}$ Rearranging equation (A-24) gives the relationship of the two roots $\tan\beta_1 = \frac{C'}{A'}\frac{1}{\tan\beta_2} = \frac{C'}{A'}\tan\left[\frac{\pi}{2} - \beta_2\right]$ (A-25)

For several specific port arrangements relevant to the surface pressure sensor matrix design as described previously, the relationship between the two roots can be written in closed form. Three of these special arrangements will be now be discussed.

e. Root Selection Criteria for the Triples on Lateral Meridian

Along the lateral angle-of-sideslip meridian, the outer port clock angles are ±90°, and $a_{ijk} = \cos \alpha \cos \lambda_{ijk}$, $b_{ijk} = \pm \sin \lambda_{ijk}$, thus equation (A-24) reduces to $\left[\frac{C'}{A'}\right] = \frac{\Gamma_{ik}a_j^2 + \Gamma_{ji}a_k^2 + \Gamma_{kj}a_i^2}{\Gamma_{ik}b_j^2 + \Gamma_{ji}b_k^2 + \Gamma_{kj}b_i^2}$ (A-26)

$= \cos^2\alpha \frac{\Gamma_{ik}\cos^2\lambda_j + \Gamma_{ji}\cos^2\lambda_k + \Gamma_{kj}\cos^2\lambda_i}{\Gamma_{ik}\sin^2\lambda_j + \Gamma_{ji}\sin^2\lambda_k + \Gamma_{kj}\sin^2\lambda_i}$ $= -\cos^2\alpha$ Thus, along the lateral meridian, the relationship between the two solutions of equation (A-22) is:

$\tan\beta_1 = \cos^2\alpha \tan\left[\beta_2 - \frac{\pi}{2}\right]$ (A-27)

Even for angles of attack as high as 50 degrees the two angle of sideslip solutions are nearly 70 degrees out of phase. Consequently, for triples along the lateral meridian, selecting the root with |β| closest to zero will always gives the correct solution for β.

f. Off-Meridian Triples, Symmetric Arrangement

Assume ports i and j lie the lateral meridian and port k lies on the vertical meridian, then $\phi_i = \frac{\pi}{2}, \Rightarrow a_i = \cos\alpha\cos\lambda_i, b_i = \sin\lambda_i$ (A-28)

$\phi_j = \frac{\pi}{2}, \Rightarrow a_j = \cos\alpha\cos\lambda_j, b_j = -\sin\lambda_j$ $\phi_k = 0, \rightarrow a_k = \cos \alpha \cos \lambda_k + \sin \alpha \sin \lambda_k, b_k = 0$ (A-28)

and for a symmetric arrangement, $\lambda_i=\lambda_j$, and C'/A' reduces to $$\frac{C'}{A'} = \cos^2\alpha\left\{\frac{\cos\lambda_j^2(\Gamma_{ik}+\Gamma_{kj})+\Gamma_{ji}(\cos\lambda_k+\tan\alpha\sin\lambda_k)^2}{\sin^2\lambda_j(\Gamma_{ik}+\Gamma_{kj})}\right\} \quad (A\text{-}29)$$

Noting that $\Gamma_{ik}+\Gamma_{kj}=-\Gamma_{ji}\rightarrow$ Equation (A-29) can be reduced further $$\frac{C'}{A'} = \cos^2\alpha\left[\frac{-\Gamma_{ji}\cos\lambda_j^2+\Gamma_{ji}(\cos\lambda_k+\tan\alpha\sin\lambda_k)^2}{-\Gamma_{ji}\sin^2\lambda_j}\right] \quad (A\text{-}30)$$

$$= \frac{\cos^2\alpha}{\sin^2\lambda_j}\left[\cos\lambda_j^2 - \frac{1}{\cos^2\alpha}(\cos\alpha\cos\lambda_k+\sin\alpha\sin\lambda_k)^2\right]$$

$$= \frac{\cos^2\alpha\cos\lambda_j^2 - \cos^2(\alpha-\lambda_k)}{\sin^2\lambda_j}$$

Substituting Equation (A-30) into equation (A-25), the relationship between the two roots becomes $$\tan\beta_1 = \left[\frac{\cos^2\alpha\cos\lambda_j^2 - \cos^2(\alpha-\lambda_k)}{\sin^2\lambda_j}\right]\tan\left[\frac{\pi}{2}-\beta_2\right] \quad (A\text{-}31)$$

For the surface pressure sensor matrix, there are two possible symmetric off-meridian angle of sideslip triples combinations, $$\{\lambda_i, \lambda_j, \lambda_k\}=\{20°, 20°, 45°\}, \text{ and } \{\lambda_i, \lambda_j, \lambda_k\}=\{20°, 20°, 20°\} \quad (A\text{-}32)$$

For the first set of coordinates $\{\lambda_i,\lambda_j,\lambda_k\}=\{20°,20°,45°\}$ the system is highly ill-conditioned. This ill-conditioning make selecting the correct root impossible. Furthermore, when the second set of coordinates $\{\lambda_i,\lambda_j,\lambda_k\}=\{20°,20°,20°\}$ is used a singularity exist at $\alpha=0°$ and $\beta=0°$.

Clearly, using the $\lambda_k=45°$ port is the preferable choice for the off-lateral meridian. If one assumes that true angle-of-sideslip limits to be experienced are less than $\pm 20°$, then for $\alpha\leq 17°$, and $\alpha\geq 20°$, a "root closest to zero" criterion is valid for selecting the "correct" root. For values of $\alpha$ between $17°$ and $20°$, the $\lambda_{\{ijk\}}=\{20°,20°,45°\}$ system is indeterminate, and instead the $\lambda_{\{ijk\}}=\{20°,20°,20°\}$ triple is used. With this substitution, then a "root closest to zero" criterion always selects the correct root.

g. Off-Meridian Triples, Asymmetric Arrangement

The root locations for one special case asymmetric port arrangement can be analyzed, that is the arrangement where $\lambda_j=0$. Consider the case where, $$\phi_i = \pm\frac{\pi}{2}, \Rightarrow a_i = \cos\alpha\cos\lambda_i, b_i = \pm\sin\lambda_i$$

$$\phi_j=0, \lambda_j=0 \rightarrow a_j=\cos\alpha, b_j=0$$

$$\phi_k=0, \rightarrow a_k=\cos\alpha\cos\lambda_k+\sin\alpha\sin\lambda_k\cos(\alpha-\lambda_k), b_k=0 \quad (A\text{-}33)$$

Following the same procedures as before $$\frac{C'}{A'} = \frac{\Gamma_{ik}\cos^2\alpha+\Gamma_{ji}\cos^2(\alpha-\lambda_k)+\Gamma_{kj}\cos^2\alpha\cos^2\lambda_i}{\Gamma_{kj}\sin^2\lambda_i} \quad (A\text{-}34)$$

Factoring out $\cos^2\alpha$ $$\frac{C'}{A'} = \cos^2\alpha\left\{\frac{\Gamma_{ik}+\Gamma_{ji}\frac{\cos^2(\alpha-\lambda_k)}{\cos^2\alpha}+\Gamma_{kj}\cos^2\lambda_i}{\Gamma_{kj}\sin^2\lambda_i}\right\} \quad (A\text{-}35)$$

$$= \cos^2\alpha\left\{\frac{\Gamma_{ik}+\Gamma_{ji}\frac{\cos^2(\alpha-\lambda_k)}{\cos^2\alpha}+\Gamma_{kj}(1-\sin^2\lambda_i)}{\Gamma_{kj}\sin^2\lambda_i}\right\}$$

Collecting terms, equation (A-35) reduces to $$\frac{C'}{A'} = \cos^2\alpha\left\{\frac{(\Gamma_{ik}+\Gamma_{kj})+\Gamma_{ji}\frac{\cos^2(\alpha-\lambda_k)}{\cos^2\alpha}-\Gamma_{kj}(\sin^2\lambda_i)}{\Gamma_{kj}\sin^2\lambda_i}\right\} \quad (A\text{-}36)$$

$$= \cos^2\alpha\left\{\frac{\Gamma_{ij}+\Gamma_{ji}\frac{\cos^2(\alpha-\lambda_k)}{\cos^2\alpha}-\Gamma_{kj}(\sin^2\lambda_i)}{\Gamma_{kj}\sin^2\lambda_i}\right\}$$

$$= \cos^2\alpha\left\{\frac{\Gamma_{ji}\left(\frac{\cos^2(\alpha-\lambda_k)}{\cos^2\alpha}-1\right)}{\sin^2\lambda_i}-1\right\}$$

The pressure dependent term, $$\frac{\Gamma_{ji}}{\Gamma_{kj}},$$

can be removed from equation (A-34) by substituting in from equation (A-5). Defining $$\Psi \equiv \frac{\left[\frac{\cos^2(\alpha-\lambda_k)}{\cos^2\alpha}-1\right]}{\sin\lambda_i^2} \quad (A\text{-}37)$$

then equation (A-37) reduces to $$\frac{C'}{A'} = \cos^2\alpha\left[\frac{\Gamma_{ji}}{\Gamma_{kj}}\Psi-1\right] \quad (A\text{-}38)$$

and finally $$\tan\beta_1 = \cos^2\alpha\left[\frac{\Gamma_{ji}}{\Gamma_{kj}}\Psi-1\right]\tan\left[\frac{\pi}{2}-\beta_2\right] \quad (A\text{-}39)$$

For the surface pressure sensor matrix 120 design, there are four possible asymmetric off-meridian angle of sideslip triples combinations, $$\{\{\lambda_i,\phi_i\},\{\lambda_j,\phi_j\},\{\lambda_k,\lambda_k\}\}=\{\{20°,\pm 90°\},\{0°,0°\},\{45°,0°\}\} \quad (A\text{-}40)$$

and $$\{\{\lambda_i,\phi_i\},\{\lambda_j,\phi_j\},\{\lambda_k,\phi_k\}\}=\{\{20°,\pm 90°\},\{0°,0°\},\{20°,0°\}\} \quad (A\text{-}41)$$

For the first sets of coordinates is $\{\lambda_i,\phi_j\},\{\lambda_j,\phi_j\},\{\lambda_k,\phi_k\}\}=\{\{20°,\pm 90°\},\{0°,0°\},\{45°,0°\}\}$. In the range of $|\beta|<25°$, it is very interesting that the second solution is nearly independent of the value of the first solution. For $\phi_i=90°$, $\beta_2=-80°$; and for $\phi_i=-90°$, $\beta_2=8°$.

The second set of coordinates is $\{\lambda_i,\phi_i\},\{\lambda_j,\phi_j\},\{\lambda_k,\phi_k\}\}=\{\{20°,\pm 90°\},\{0°,0°\},\{20°,0°\}\}$. Again in the range of $|\beta|<25°$, it is very interesting to note that $\beta_2$ is identical to the value given by the previous set of coordinates ($\lambda_k=45°$). Clearly, the terms involving $\lambda_k$ are canceled out of equation (A-35). As a result for the asymmetric configuration, a "root closest to zero" criterion will always pick the correct solution.

h. Angle of Sideslip Solution Summary

The quadratic equation, (A-22), has two roots, with no guarantees that they be in general orthogonal. However, several conclusions can be made though for special geometry arrangements that the surface pressure sensor matrix 120 exploits in its design. These conclusions are:

i. For triples which lie on the lateral meridian, the solutions are nearly orthogonal, and for $|\beta|<25°$, using a "root closest to zero" selection criterion always pick the correct solution.

ii. For off-meridian triples arrangements, only the symmetric arrangement presents a problem. For this arrangement, there exists a singularity point at which all three incidence angles are equal. In the vicinity of this singularity, the system is highly ill-conditioned. This ill-conditioning makes the system indeterminate and selecting the correct root is impossible without prior information.

iii. For the surface pressure sensor matrix 120, using the lower 45° sensor location to complete the symmetric triple puts the singularity at 18.207° local angle of attack. Using the lower 200 sensor location puts the singularity at 0° local angle of attack.

iv. If one assumes that true angle of sideslip limits to be experienced are less than ±25°, then for the $\lambda_{\{ijk\}}=\{20°, 20°, 45°\}$ triple, for $\alpha \leq 17°$, $a \geq 20°$, a "root closest to zero" criterion is valid for selecting the "correct" root. For values of $\alpha$ between 17° and 20°, the $\lambda_{\{ijk\}}=\{20°, 20°, 45°\}$ system should be considered indeterminate, and instead the $\lambda_{\{ijk\}}=\{20°, 20°, 20°\}$ triple should be used. If this substitution is made, then a "root closest to zero" criterion will always be valid for selecting the "correct" root.

v. For the asymmetric off-meridian configuration, the alternate $\beta$ solution will always hover around ±80 degrees. Thus the "root closest to zero" criterion is always valid.

i. Static Pressure, Impact Pressure, and Mach Number Solution

Once the local values of $\alpha$ and $\beta$ have been determined, then the incidence angles at all of the sensor locations can be evaluated, and only $\epsilon$, $p_\infty$, and $q_c$ remain as unknowns in the pressure equations. Assuming that n pressure measurements are to be used, the flow model equation (equation (A-1)) can be written in matrix form with static and impact pressure broken-out as variables:

$$\begin{bmatrix} p_1 \\ \vdots \\ p_n \end{bmatrix} = \begin{bmatrix} \left(\cos^2(\theta 1) + \varepsilon^{\sin 2(\theta 1)}\right) & 1 \\ \vdots & \vdots \\ \left(\cos^2(\theta n) + \varepsilon^{\sin 2(\theta n)}\right) & 1 \end{bmatrix} \begin{bmatrix} q_c \\ P_\infty \end{bmatrix} \quad (A\text{-}42)$$

Ignoring for now the fact that E is implicitly a function of the static and the impact pressure, equation (A-42) can be solved for the static and impact pressure using weighted linear regression. The result is:

$$\begin{bmatrix} \hat{q}_c \\ \hat{P}_\infty \end{bmatrix} = \frac{\begin{bmatrix} \sum_{i=1}^{n} q_i & -\sum_{i=1}^{n} q_i(\Omega_i) \\ -\sum_{i=1}^{n} q_i(\Omega_i) & \sum_{i=1}^{n} q_i(\Omega_i)^2 \end{bmatrix} \begin{bmatrix} \sum_{i=1}^{n} (\Omega_i) q_i P_i \\ \sum_{i=1}^{n} q_i P_i \end{bmatrix}}{\left[\sum_{i=1}^{n} q_i\right]\left[\sum_{i=1}^{n} q_i(\Omega_i)^2\right] - \left[\sum_{i=1}^{n} q_i(\Omega_i)\right]^2} \quad (A\text{-}43)$$

where $\Omega_i=\cos^2(\theta_i)+\epsilon \sin^2(\theta_i)$. In equation (A-43), the $q_i$'s are weights which have a nominal value of 1.0. Setting the value of $q_i$ to zero weights the $i^{th}$ pressure reading out of the algorithm. Equation (A-43) looks like a closed form solution, but the $\epsilon$ terms on the right hand side of equation (A-43) are implicitly a function of $p_\infty$ and $q_c$. Thus equation (A-43) is actually non-linear and the solutions for $p_\infty$ and $q_c$ must be extracted iteratively. Defining $$M_{(j)} = \begin{bmatrix} (\Omega_1^{(j)}) & 1 \\ \vdots & \vdots \\ (\Omega_n^{(j)}) & 1 \end{bmatrix}, Q = \begin{bmatrix} q_1 & \cdots & 0 \\ \vdots & \ddots & \vdots \\ 0 & \cdots & q_n \end{bmatrix} \quad (A\text{-}44)$$

where $\Omega_i^{(j)}=\cos^2(\theta_i)+\epsilon^{(j)} \sin^2(\theta_i)$, equation (A-43) is written as an iterative estimator $$\begin{bmatrix} \hat{q}_c \\ \hat{P}_\infty \end{bmatrix}_{(j+1)} = \{[M_{(j)}^T Q M_{(j)}]^{-1} M_{(j)}^T Q\} \begin{bmatrix} p_1 \\ \vdots \\ p_n \end{bmatrix} \quad (A\text{-}45)$$

In equation (A-45) the subscript (j) refers the result of the $j^{th}$ iteration. The matrix $M^{(j)}$ is defined in equation (A-44) with $\epsilon$ being evaluated using the values for Mach number resulting from the previous iteration for $p_\infty$ and $q_c$.

j. Algorithm Stability Analysis

Since equation (A-45) is to be implemented as part of a real-time airdata estimation algorithm, it is essential that potential instability regions be identified. In general, it is impossible to analyze the stability of non-linear equations in two unknowns. However, a linearized stability analysis will determine the behavior of the system with respect to small disturbances. Defining the terms:

$$Z \equiv \begin{bmatrix} p_1 \\ \vdots \\ p_n \end{bmatrix}, x \equiv \begin{bmatrix} q_c \\ p_\infty \end{bmatrix} \quad (A\text{-}46)$$

and recalling that $\epsilon$ is a function of Mach number, and implicitly a function of static and impact pressure, then $$M[x] \equiv \begin{bmatrix} \Omega_1 & 1 \\ \vdots & \vdots \\ \Omega_n & 1 \end{bmatrix} \quad (A\text{-}47)$$

and equation (A-42) can be re-written as:

$$Z = M[x]x \quad (A\text{-}48)$$

Using the definitions of equation (A-46) and (A-47), the iterative estimation equation can be written in the form:

$$Z = M[\hat{x}^{(j)}]\hat{x}^{(j+1)} \quad (A\text{-}49)$$

In equation (A-49), $\hat{x}^{(j+1)}$ is the estimate after the $j+1^{th}$ iteration, and $M[\hat{x}^{(j)}]$ is the matrix of equation (A-47) evaluated using the result from the jth iteration. Subtracting equation (A-49) from (A-48), and expanding M[x] in a Taylor's series about $\hat{x}^{(j)}$ and neglecting terms higher than first order in the perturbations, equation (A-49) reduces to:

$$[\nabla M^{(j)}_x(x-\hat{x}^{(j)})]x+M[\hat{x}^{(j)}](x-\hat{x}^{(j+1)})=0 \quad (A\text{-}50)$$

Defining the error vectors, $$\hat{x}^{(j)} \equiv (x-\hat{x}^{(j)}), \; \hat{x}^{(j+1)} \equiv (x-\hat{x}^{j+1)}) \quad (A\text{-}51)$$

Equation (A-51) becomes the linearized error equation for the iteration $$[\nabla M^{(j)}_x]\hat{x}^{(j)}+M[\hat{x}^{(j)}]\hat{x}^{(j+1)}=0 \quad (A\text{-}52)$$

and the eigenvalues (roots) of the characteristic equation $$Det\{([M[\hat{x}^{(j)}]^T M[\hat{x}^{(j)}]]^{-1}[M[\hat{x}^{(j)}]^T[\nabla M^{(j)}_x]])-\lambda I\}=0 \quad (A\text{-}53)$$

will determine the linear-stability of system. The elements of the Jacobian, $\nabla M^{(j)}_x x$, are evaluated as $$\nabla M^{(j)}_x x = \begin{bmatrix} q_c \sin^2\theta_1 \dfrac{\partial \varepsilon(j)}{\partial M_\infty} \dfrac{\partial M_\infty}{\partial q_c} & q_c \sin^2\theta_1 \dfrac{\partial \varepsilon(j)}{\partial M_\infty} \dfrac{\partial M_\infty}{\partial P_\infty} \\ \vdots & \vdots \\ q_c \sin^2\theta_1 \dfrac{\partial \varepsilon(j)}{\partial M_\infty} \dfrac{\partial M_\infty}{\partial q_c} & q_c \sin^2\theta_1 \dfrac{\partial \varepsilon(j)}{\partial M_\infty} \dfrac{\partial M_\infty}{\partial P_\infty} \end{bmatrix} \quad (A\text{-}54)$$

In equation (A-54) the parameter $$\dfrac{\partial \varepsilon}{\partial M_\infty}$$

is the sensitivity of the calibration parameter to Mach number and is determined by numerically differentiating the calibration parameter ($\epsilon M$) with respect to Mach number. The parameters $$\dfrac{\partial M_\infty}{\partial q_c}$$

and $$\dfrac{\partial M_\infty}{\partial P_\infty}$$

flare evaluated by differentiating the isentropic flow equation for subsonic flow, or the Rayleigh Pitot equation for supersonic flow. For $\gamma=1.4$, the resulting expressions are $$\dfrac{\partial M}{\partial q_c} = \dfrac{1}{P_\infty \dfrac{\partial f}{\partial M}}, \; \dfrac{\partial M}{\partial P_\infty} = \dfrac{-q_c}{P_\infty^2 \dfrac{\partial f}{\partial M}} \quad (A\text{-}55)$$

where the Mach number derivative is $$\left(\dfrac{\partial f}{\partial M}\right)_{subsonic} = 1.4 M_\infty[1+0.2 M_\infty^2]^{2.5} \text{ for } M_\infty \leq 1 \quad (A\text{-}56)$$

$$\left(\dfrac{\partial f}{\partial M}\right)_{supersonic} = 1168.45 M_\infty^6 \dfrac{[2 M_\infty^2-1]}{[7 M_\infty^2-1]^{3.5}} \text{ for } M_\infty > 1$$

Substituting equation (A-55) into equation (A-54), the Jacobian matrix reduces to $$\nabla M^{(j)}_x x = \begin{bmatrix} \left[\dfrac{q_c}{P_\infty}\right]\sin^2\theta_1 \dfrac{\partial \varepsilon(j)}{\partial M_\infty} \dfrac{1}{\dfrac{\partial f}{\partial M}} & -\left[\dfrac{q_c}{P_\infty}\right]^2 \sin^2\theta_1 \dfrac{\partial \varepsilon(j)}{\partial M_\infty} \dfrac{1}{\dfrac{\partial f}{\partial M}} \\ \vdots & \vdots \\ \left[\dfrac{q_c}{P_\infty}\right]\sin^2\theta_1 \dfrac{\partial \varepsilon(j)}{\partial M_\infty} \dfrac{1}{\dfrac{\partial f}{\partial M}} & -\left[\dfrac{q_c}{P_\infty}\right]^2 \sin^2\theta_1 \dfrac{\partial \varepsilon(j)}{\partial M_\infty} \dfrac{1}{\dfrac{\partial f}{\partial M}} \end{bmatrix} \quad (A\text{-}57)$$

Equation (A-57) is dependent only on the freestream Mach number and the local incidence angles. Therefore, for a given surface pressure sensor matrix geometry, the stability of the system (eigenvalues equation (A-53)) is dependent only on the freestream Mach number and the local flow incidence angles. This conclusion is very important, as it allows the stability characteristics of the system to be analyzed independent of trajectory.

In order to achieve the landing and ascent airdata requirements for the X-33 flight vehicle, the airdata estimation and evaluation system of the present invention is capable of operating between Mach 0.20 and Mach 4.0 and meets the following accuracy requirements:

i) Mach Number: ±5.0% accuracy for $2.5 \leq M \leq 4.0$, ±2.50% accuracy for $0.6 \leq M < 2.5$, ±0.015 absolute error between M 0.20 and M 0.60;

ii) Angle of attack: ±1.5° absolute accuracy for first 3 flights, ±0.50°, thereafter;

iii) Angle of sideslip: ±0.5° absolute accuracy for all flights;

iv) Geopotential altitude: ±200 feet absolute accuracy for $0.2 \leq M \leq 4.0$; and, v) Dynamic Pressure: ±15 psf. for $0.2 \leq M \leq 4.0$.

V. Conclusion The airdata estimation and evaluation system of the present invention computes the airdata and flow parameters from nonintrusive surface pressure measurements. This system and method transforms a flow model equation into a triples formulation equation whereby airdata may be extracted without the use of nonlinear regression methods. This results in a more accurate and more stable system and method of estimating and evaluating airdata in a FADS system. Moreover, the code required to implement and maintain the method of the present invention is less complex than prior art algorithms.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A flush airdata sensing (FADS) system, for use on a vehicle in a flowfield, comprising:

surface mounted pressure sensors located on the vehicle for providing a surface pressure distribution;

a airdata estimation system, connected to the surface mounted pressure sensors, for estimating and evaluating airdata from the surface pressure distribution and the flow model equation, the airdata estimation system comprising:

a triples formulation module that transforms the flow model equation into a triples formulation equation by using pressure quantities corresponding to the surface pressure distribution;

an angle of attack module that computes an angle of attack quantity from the triples formulation equation by choosing the pressure quantities such that the angle of attack quantity is decoupled from an angle of sideslip quantity;

an angle of sideslip module that computes the angle of sideslip quantity from the triples formulation equation by using the angle of attack quantity;

a airdata module that estimates and evaluates airdata by using the angle of attack quantity and the angle of sideslip quantity; and, a control system computer, connected to the airdata estimation system, for adjusting an orientation of the vehicle in the flowfield from estimated and evaluated airdata.

2. The invention as set forth in claim 1, wherein the flow model equation is a splice of a subsonic potential flow solution for a blunt body and a hypersonic modified Newtonian flow.

3. The invention as set forth in claim 1, wherein the triples formulation module further comprises:

a triples difference module that transforms the flow model equation into the triples formulation equation by taking the difference of pressure quantities from the surface pressure distribution.

4. The invention as set forth in claim 3, wherein the pressure quantities are three pressure quantities from the surface pressure distribution.

5. The invention as set forth in claim 3, wherein:

the flow model equation is a function of a first pressure quantity of the surface pressure distribution, a static pressure, an impact pressure, a position error calibration parameter, the angle of attack quantity and the angle of sideslip quantity; and, the triples formulation equation is a function of the first pressure quantity, a second pressure quantity, and a third pressure quantity, all corresponding to the surface pressure distribution, and the angle of attack quantity and the angle of sideslip quantity.

6. The invention as set forth in claim 1, wherein the angle of attack module further comprises:

a pressure selection module that chooses the pressure quantities such that they all lie in a vertical plane of the surface pressure distribution.

7. The invention as set forth in claim 6, wherein the number of pressure quantities is at least three.

8. The invention as set forth in claim 1, wherein the angle of attack module further comprises:

a mean AOA module that computes a mean angle of attack quantity from each computed angle of attack quantity of the surface pressure distribution.

9. The invention as set forth in claim 1, wherein the angle of sideslip module further comprises:

an AOS equation module that transforms the triples formulation equation into an angle of sideslip equation.

10. The invention as set forth in claim 9, wherein the angle of sideslip equation is a quadratic equation.

11. The invention as set forth in claim 10, wherein the quadratic equation comprises a trigonometric function of the angle of sideslip quantity.

12. The invention as set forth in claim 11, wherein the trigonometric function is a tangent.

13. The invention as set forth in claim 10, wherein the angle of sideslip quantity is one of two roots of the quadratic equation.

14. The invention as set forth in claim 13, wherein the angle of sideslip quantity is a root of the quadratic equation having an absolute value of the root closest to zero.

15. The invention as set forth in claim 1, wherein the angle of sideslip module further comprises:

a mean AOS module that computes a mean angle of sideslip quantity from each computed angle of sideslip quantity corresponding to a pressure of the surface pressure distribution.

16. The invention as set forth in claim 1, wherein the airdata module further comprises:

a matrix module that writes the flow model equation as a matrix to form a flow matrix equation and solves the flow matrix equation for a static pressure and an impact pressure.

17. The invention as set forth in claim 16, wherein the matrix module further comprises:

an iterative estimator module that constructs an iterative estimator from the flow matrix equation and solves iteratively for the static pressure and the impact pressure.

* * * * *